(12) United States Patent
Pfister et al.

(10) Patent No.: US 7,085,588 B1
(45) Date of Patent: *Aug. 1, 2006

(54) SYSTEM AND METHOD FOR DETERMINING AND REPRESENTING ONE OR MORE POTENTIAL PHYSICAL LOCATIONS OF A NEWLY DETECTED WIRELESS NETWORK DEVICE

(75) Inventors: Roger Pfister, Wokingham (GB); Floyd Backes, Sharon, NH (US); Paul D. Callahan, Carlisle, MA (US)

(73) Assignee: Autocell Laboratories, Inc., Acton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/937,550

(22) Filed: Sep. 9, 2004

Related U.S. Application Data

(63) Continuation-in-part of application No. 10/855,669, filed on May 27, 2004.

(51) Int. Cl.
*H04Q 7/20* (2006.01)

(52) U.S. Cl. ...................... 455/556; 455/446

(58) Field of Classification Search ........... 455/446, 455/67.11, 447, 423, 566, 422.1, 500, 507, 455/517, 404.2, 456.1, 456.2; 345/156, 169; 715/700, 764, 781; 340/7.2, 825
See application file for complete search history.

(56) References Cited

U.S. PATENT DOCUMENTS

| | | | |
|---|---|---|---|
| 5,579,535 A * | 11/1996 | Orlen et al. | 455/421 |
| 5,955,988 A * | 9/1999 | Blonstein et al. | 342/359 |
| 5,974,330 A * | 10/1999 | Negishi | 455/457 |
| 6,795,407 B1 | 9/2004 | Chesson | |
| 6,870,815 B1 | 3/2005 | McFarland et al. | |
| 6,897,787 B1 * | 5/2005 | Colorado et al. | 340/815.4 |
| 2001/0034223 A1 * | 10/2001 | Rieser et al. | 455/404 |
| 2003/0055604 A1 * | 3/2003 | Skidmore et al. | 702/186 |
| 2004/0032857 A1 * | 2/2004 | Tannan | 370/351 |
| 2004/0043774 A1 * | 3/2004 | Lee | 455/456.1 |
| 2004/0166879 A1 * | 8/2004 | Meadows et al. | 455/456.1 |
| 2004/0224682 A1 * | 11/2004 | Kang | 455/433 |
| 2004/0259554 A1 * | 12/2004 | Rappaport et al. | 455/446 |
| 2005/0003797 A1 * | 1/2005 | Baldwin | 455/404.1 |

(Continued)

*Primary Examiner*—Jean Gelin
(74) *Attorney, Agent, or Firm*—McGuinness & Manaras LLP

(57) ABSTRACT

A previously unknown wireless device, which may be either an access point or a station, is detected by receipt of transmissions from that device at one or more access points that are currently operating within a managed wireless network. A graphic representation of the newly detected device is displayed in a region of a user interface external to a region containing a representation of the physical environment of the managed wireless network. A user selects a number of known access points from which an estimated distance to the newly detected device is to be determined and represented. A representation is generated of an estimated distance from each one of the selected number of access points, such as those access points that are estimated to be physically closest to the newly detected device, for example on the asis of signal strength with regard to transmissions from the newly detected device received at the known access points. The distance representations from the known access points may be provided using substantially circular "distance rings", displayed in the region of the user interface containing a representation of the physical environment in which the wireless network is deployed. The distance rings enable a user to may observe one or more distance ring intersections indicating one or more potential positions within the wireless network's physical environment at which the newly detected device may be located.

21 Claims, 25 Drawing Sheets

U.S. PATENT DOCUMENTS

| | | |
|---|---|---|
| 2005/0020279 A1* | 1/2005 | Markhovsky et al. .... 455/456.1 |
| 2005/0040944 A1* | 2/2005 | Contestabile .......... 340/539.13 |
| 2005/0048987 A1* | 3/2005 | Glass ...................... 455/456.1 |
| 2005/0070304 A1* | 3/2005 | Farchmin et al. ........ 455/456.1 |
| 2005/0113123 A1* | 5/2005 | Torvinen .................... 455/519 |
| 2005/0136931 A1* | 6/2005 | Bigler et al. ................ 455/446 |

* cited by examiner

SYSTEM AND METHOD FOR DETERMINING AND REPRESENTING ONE OR MORE POTENTIAL PHYSICAL LOCATIONS OF A NEWLY DETECTED WIRELESS NETWORK DEVICE

CROSS REFERENCE TO RELATED APPLICATION

This application is a Continuation in Part of U.S. patent application Ser. No. 10/855,669, entitled "AUTOMATICALLY POPULATED DISPLAY REGIONS FOR DISCOVERED ACCESS POINTS AND STATIONS IN A USER INTERFACE REPRESENTING A WIRELESS COMMUNICATION NETWORK DEPLOYED IN A PHYSICAL ENVIRONMENT", and filed May 27, 2004, all disclosures of which are hereby included by reference herein.

FIELD OF THE INVENTION

The disclosed system relates generally to wireless communication systems, and more specifically to a system and method for determining and representing one or more potential physical locations of a newly detected wireless network device.

BACKGROUND OF THE INVENTION

Wireless communication networks are becoming increasingly common for interconnecting many types of electronic devices. Computer systems of all sizes, personal digital assistants, input/output devices, entertainment system components and other types of home appliances, are all examples of client station devices that are candidates for interconnection using a wireless communication network. Various specific wireless communication protocols have been developed. Examples of existing wireless communication protocols may be found in the family of standards for wireless Local Area Networks (LANs) known as IEEE 802.11, including the 802.11a, 802.11b, and 802.11g wireless communication standards.

Generally, wireless networks include some number of access devices (referred to herein as "access points") that provide network access to some number of wireless client devices (referred to herein as "stations"). For example, an access point in a wireless network may be connected to a wired communication network, and client stations using the wireless network are provided wireless access to the wired network through the access point.

Existing systems for managing wireless networks have provided inconvenient, overly costly, and/or inadequate tools for determining the physical position of a newly added, or newly operational, access points and/or station. In general, a problem may arise when a new wireless device is added to a managed wireless network without notification of, and/or permission from the manager of that network. The network manager may wish to locate such a "rogue" device, in order to determine if it should be turned-off, disabled, reconfigured, etc. Similarly, the network manager may wish to find the physical location of a previously unknown wireless device that begins operation within the managed wireless network. The operation of such "rogue" devices may compromise the overall security, and/or performance of the wireless network.

In some existing systems, a significant number of "probe" wireless devices must be installed at known positions within the wireless network in order to help a network manager determine the physical locations of all wireless devices. Such probe devices are costly, and the added cost to the overall network costs may be substantial. Moreover, such probe devices are incapable of simultaneously acting as probes and access points or station devices.

For the above reasons and others, it would be desirable to have a new system for determining the physical location of a wireless network device. The new system should be convenient and intuitive for use by a system manager, and not require the use of dedicated probe devices.

SUMMARY OF THE INVENTION

To address the above described and other shortcomings of existing systems, a method and system for determining and representing one or more potential locations of a newly detected wireless network device. The disclosed system first detects a wireless device, which may be either an access point or a station, by receiving transmissions from that device at one or more devices that are currently within the wireless network being managed. A graphic representation of the newly detected device is then provided in a predetermined region of a user interface, external to another region of the user interface containing a representation of the physical environment in which the wireless network is deployed. The system then enables the user to select a number of known access points within the wireless network from which an estimated distance to the newly detected device is to be determined and represented. A representation is then generated of an estimated distance from each one of the selected number of access points, such as those access points that are estimated to be physically closest to the newly detected device. The estimations of distance between the newly detected device and the known access points may be made on the basis of signal strength with regard to transmissions from the newly detected device received at the known access points.

The representation of distance from each of the known access points to the newly added device may be provided using a substantially circular "ring", referred to herein for purposes of explanation as a "distance ring" surrounding each of the known access points. The distance rings are displayed in the region of the user interface containing a representation of the physical environment in which the wireless network is deployed. The distance rings may be displayed surrounding icon representations of the known access points, previously positioned over the representation of the physical environment in which the wireless network is deployed such that they correspond to physical locations of the known devices they represent.

After display of the distance rings, a user may observe one or more distance ring intersections. The distance ring intersections indicate one or more potential positions within the physical environment at which the newly detected device may be located. If the user desires more distance rings to be displayed, they can increase the number of known access points for which distance rings are to be generated. Similarly, if the number of distance rings being displayed is too great, the user can decrease the number of selected known access points.

Using the distance ring intersections, the user can then investigate the corresponding likely positions of the new device within the physical environment in which the wireless network is deployed. The user may then, for example following sufficient confirmation of the new device's actual physical position, move the graphic representation of the new device into the region of the user interface in which a representation of the wireless network's physical environment is displayed. Alternatively, a network manager may wish to disable or remove the new device in order to eliminate potential or actual any adverse security or performance impact on the network.

In one embodiment, the distance rings may be displayed simultaneously with power range rings representing radio coverage ranges of the access point devices corresponding to the access point representations at their centers. In such a case, the distance rings are generated in a visually distinct manner with respect to the power range rings. For example, the width of the distance rings may be used to visually distinguish them from the power range rings, i.e. the distance rings may be substantially thicker than the power range rings.

Thus there is disclosed a new system for determining the physical location of a wireless network device. The disclosed system is advantageously convenient and intuitive for use by a system manager, and does not require the use of dedicated probe devices.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
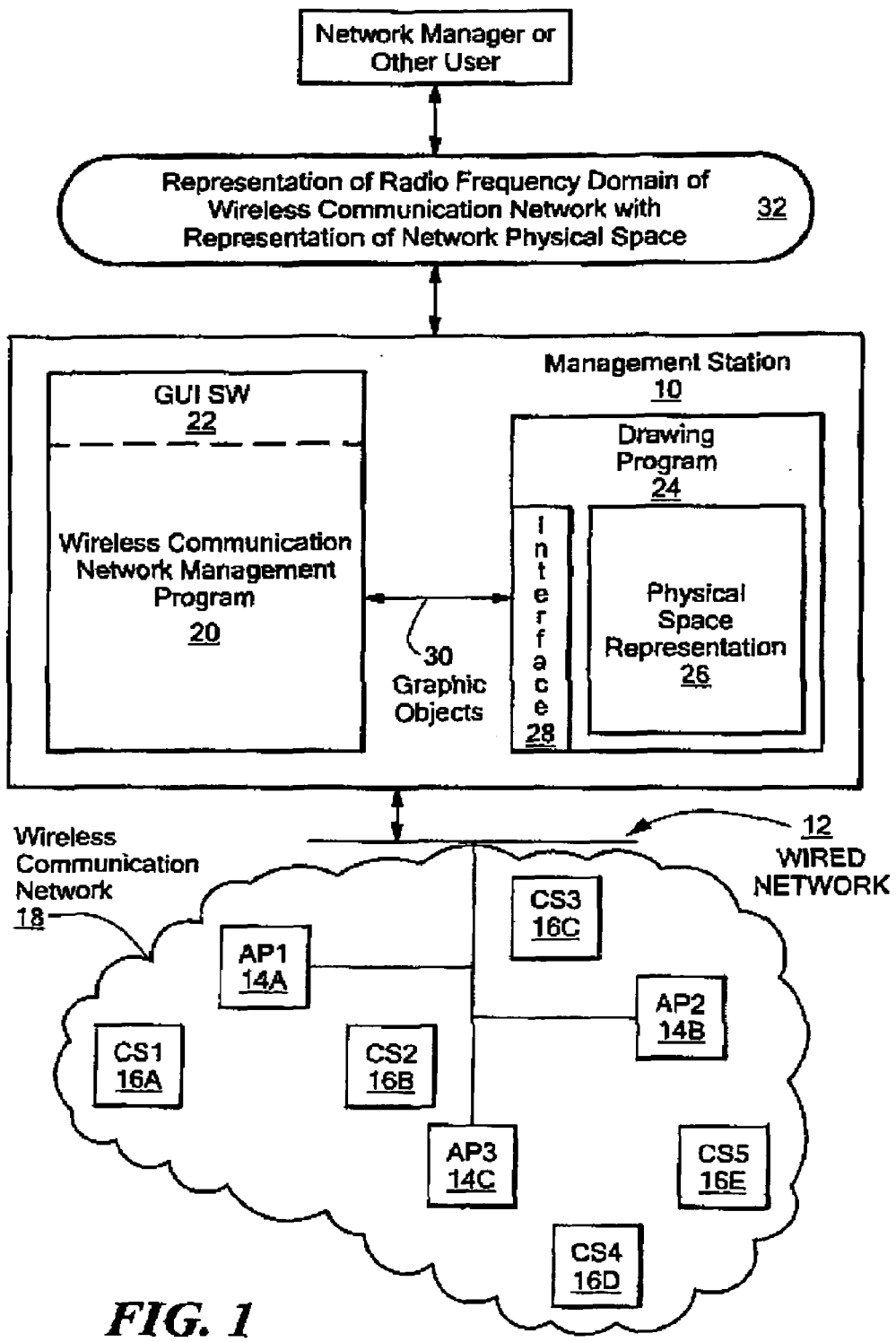
FIG. 1 is a block diagram showing an illustrative embodiment of the disclosed system architecture, including a wireless communication network management program and a separate drawing program.

As shown in FIG. 1, an illustrative embodiment of the disclosed system includes a wireless communication network management software program 20 and a separate drawing software program 24 executing on a management station 10. The management station 10 may, for example, consist of any specific type of computer system, including one or more processors operable to execute program code stored in a computer program memory or other type of computer program storage device, and having a number of input/output devices and interfaces. The management station 10 is communicably coupled to a wired network 12, which in turn is coupled to a number of wireless access point devices 14, shown for purposes of illustration as access points AP1 14A, AP2 14B, and AP3 14C. The access point devices 14 provide wireless access to the wired network 12 to client station devices 16. The client station devices 16 are shown for purposes of illustration as client stations CS1 16A, CS2 16B, CS3 16C, CS4 16D, and CS 5 16E. The access point devices 14 and the client station devices 16 are shown within a wireless communication network 18. The wireless communication network 18 is accessible to and managed by the wireless communication network management program 20. The management station 10, and each of the access point devices 14 and client station devices 16 shown in FIG. 1 include hardware, firmware, and/or software implemented functionality enabling them to communicate using one or more networking protocols to exchange information, such as messages or packets.

During operation of the embodiment shown in FIG. 1, the wireless communication network management program 20 uses graphical user interface software (GUI SW) 22 to provide a user interface output 32. The output 32 includes a graphical representation of the radio frequency domain characteristics of one or more devices in the wireless communication network 18, in combination with a graphical representation of the physical space in which the wireless communication network 18 is deployed. In order to generate the output 32, the wireless communication network management program 20 communicates with the drawing program 24 through an application programming interface (API) 28. For example, display objects 30, commands and/or other data may be communicated between the wireless communication network management program 20 and the drawing program 24. An electronic, computer readable representation 26 of the physical space 26, such as a data file or other type of electronic document, is stored by or within the drawing program 24. In an illustrative embodiment, the drawing program 24 consists of a copy of the Visio® drawing program provided by the Microsoft Corporation of Redmond Wash.

Figure 2:
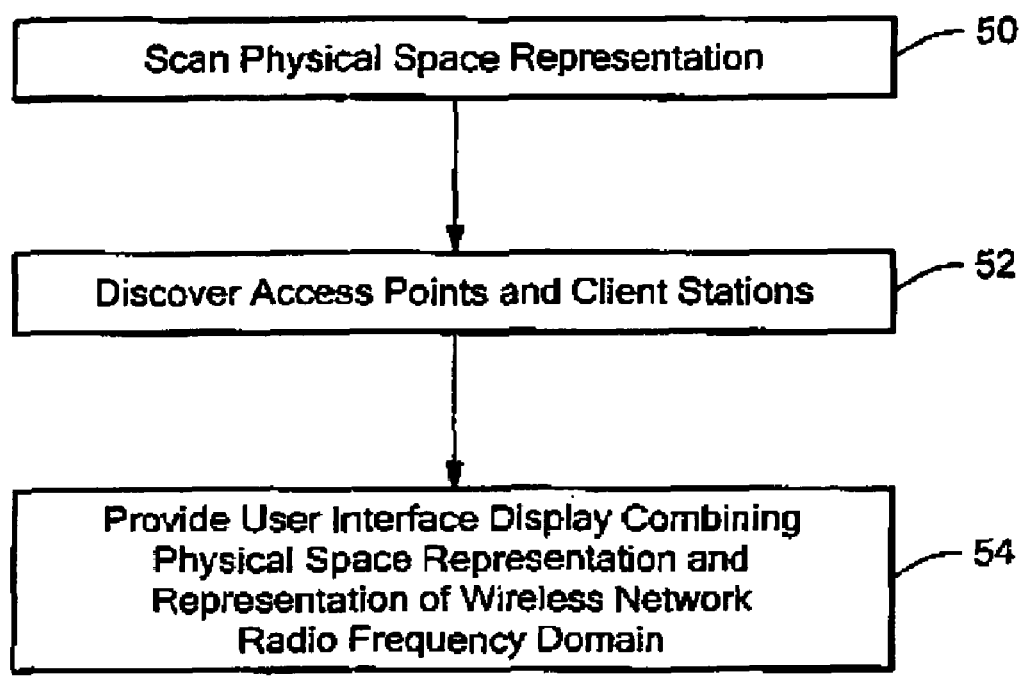
FIG. 2 is a flow chart showing steps performed by an illustrative embodiment of the disclosed system to provide a representation of a wireless communication network including a representation of the physical environment of a managed wireless communication network, in combination with a representation of the radio frequency domain characteristics of devices in the wireless communication network.

FIG. 2 is a flow chart showing steps performed in an illustrative embodiment of the disclosed system to provide a graphical representation of the physical environment of a managed wireless communication network, in combination with a graphical representation of the radio frequency domain characteristics of devices in the wireless communication network. At step 50, the disclosed system operates to scan a computer readable physical space representation, such as an electronic file or other document. For example, a user may provide a pointer or other indication of an electronically stored floor plan diagram to be used as a physical space representation. The physical space representation is then parsed by the wireless communication network management program 20 for indications of access point and/or client station devices. Information describing the access point and client station devices found at step 50 is then stored in data elements or entries corresponding to those devices in a device log file or other suitable data structure. The disclosed system may further operate to determine scale information regarding the display of the physical space representation, in order to represent the radio frequency domain characteristics of devices in the wireless communication network in the same scale as that used to display the physical space representation.

At step 52, the disclosed system operates to discover the access point and client station devices in the wireless communication network being managed. For example, the wireless communication network may be associated with a predetermined subnet mask, and that subnet mask may be used to discover devices on the wireless network that match the subnet mask. Such wireless network device discovery may be performed using techniques such as the PING (Packet Internet Groper) utility, which check for all responding device IP (Internet Protocol) addresses corresponding to the predetermined subnet mask. In addition, the Address Resolution Protocol (ARP) may, for example, then be used for translating IP addresses into the 6-byte Ethernet addresses of the discovered devices.

After the disclosed system has discovered a device on the wireless communication network, a request message, such as an SNMP (Simple Network Management Protocol) request message, is sent to that device to determine whether the device is manageable by the wireless communication network management program 20 of FIG. 1. Devices that return a positive response are sent further request messages to determine characteristics and settings of the devices. Such characteristics and settings may be obtained, for example, through values stored in the Management Information Base (MIB) of the devices, and include indications of characteristics and settings such as transmit power settings and lists of associated client stations for access points.

At step 54, the disclosed system operates to combine representations of the radio frequency domain characteristics of the wireless network devices with the physical space representation. As a result, the radio frequency domain characteristics of the wireless network devices may be conveniently indicated to the user within the context of and at the same scale as the physical space representation. For example, the disclosed system may operate by creating one or more wireless device radio frequency domain representations in one or more graphical "layers" defined using the drawing program 24, that may be superimposed over the physical space representation in a user interface display.

The wireless communication network management program 20 subsequently operates to periodically send further request messages to the access point devices discovered in step 52, in order to monitor their radio frequency domain characteristics and settings, such as current transmit power settings and associated client station lists. Any changes detected using these requests may then be used to modify radio frequency domain representations of the wireless network devices that are layered over the physical space representation 26 in the user interface.

Figure 3:
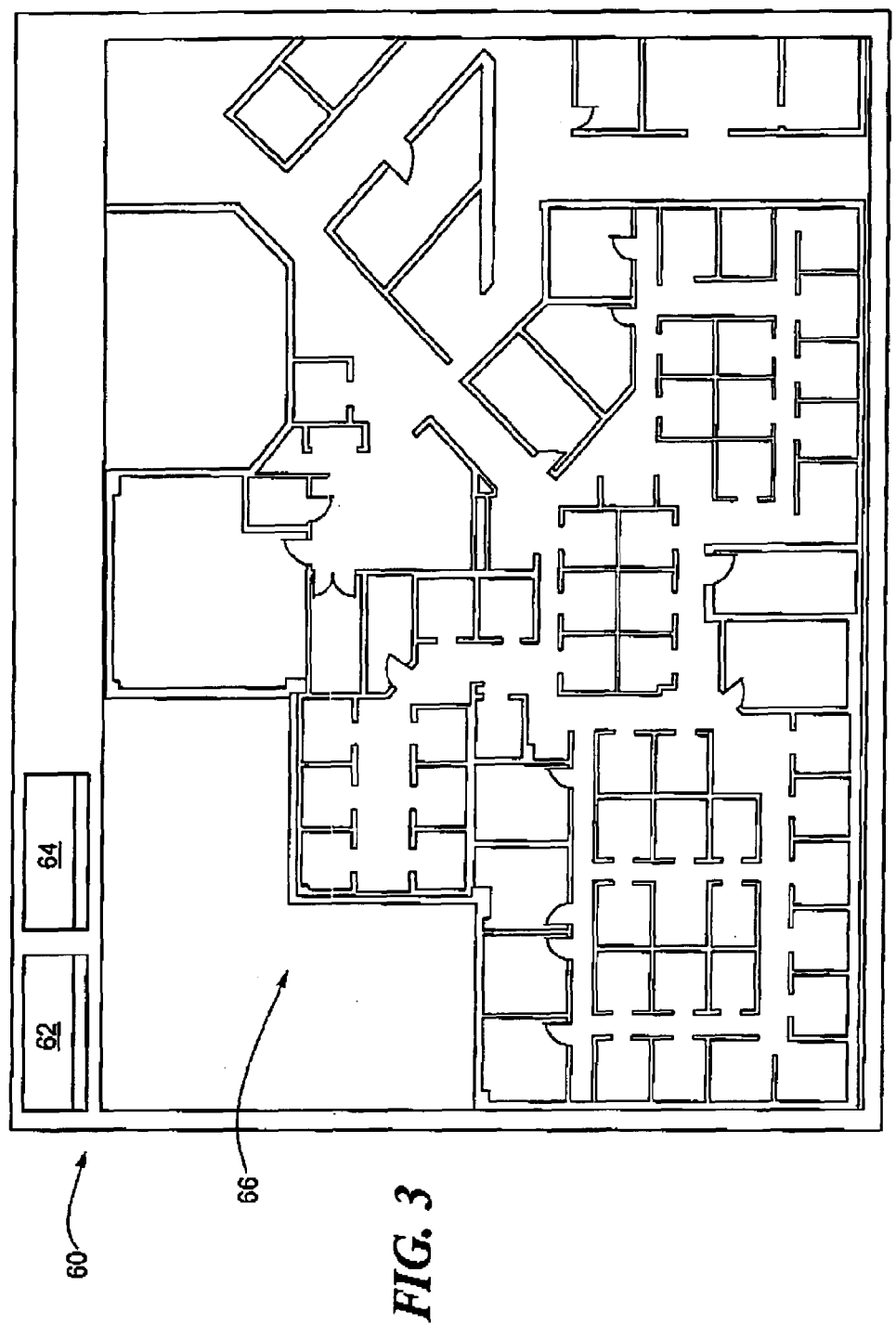
FIG. 3 shows a portion of a user interface display including a first display region for showing graphical representations of discovered access point devices, a second display region for showing graphical representations of client station devices associated with the discovered access point devices, and a physical space display region showing a representation of a physical environment for the managed wireless network.
Figure 4:
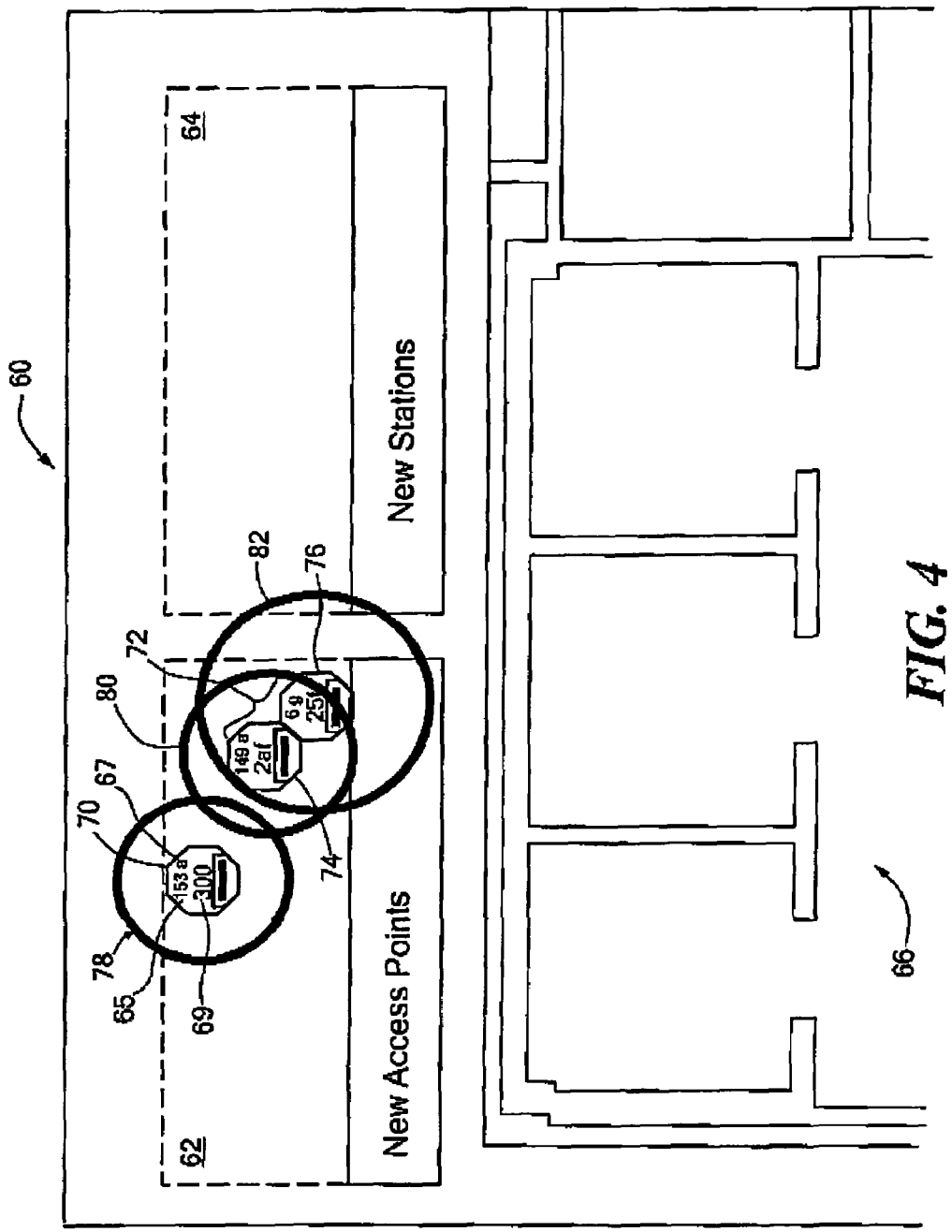
FIG. 4 shows a portion of a user interface display including a number of graphical representations of corresponding access point devices that have been discovered in the managed wireless network, including a graphical representation of an access point device having multiple radio frequency band capabilities.

FIG. 3 shows a portion 60 of a user interface display including a first display region 62 for showing graphical representations of discovered access point devices, a second display region 64 for showing representations of client station devices associated with the discovered access point devices, and a physical space display region 66 showing a graphical representation of a physical environment for the managed wireless network. FIG. 3 shows the portion 60 of the user interface display prior to discovery of any devices in the managed wireless communication network. FIG. 4 shows the portion 60 of the user interface display shown in FIG. 3, including a number of access point representations of corresponding access point devices that have been discovered in the managed wireless network, and including a graphical representation of an access point device having multiple radio frequency band capabilities. The graphical representations of discovered access point devices shown in FIG. 4 are shown displayed within the first display region 62.

As shown in FIG. 4, access point representation 70 has an associated power range ring 78. The multi-band access point representation 72 represents a single corresponding access point device having multiple radio frequency band capabilities, and includes conjoined access point representations 74 and 76, each having the same visual appearance as representations of single radio frequency band capable access point devices. For example, the access point representation 74 may represent the IEEE 802.11a radio frequency band circuitry within the multi-band access point device corresponding to the graphical representation 72, and the access point representation 76 may represent the IEEE 802.11 g radio frequency band circuitry within the multi-band access point device corresponding to the graphical representation 72.

The conjoined access point representations 74 and 76 each have respective associated power range rings 80 and 82. The areas within the power range rings 78, 80 and 82 represent radio coverage ranges of the access point devices corresponding to the access point representations at their centers. The greater the diameter of a power range ring, the larger the area of the radio coverage range it represents.

The thickness of each of the power range rings 78, 80, and 82 represents the potential bandwidth that can be provided by the associated access point devices to client stations located within them. A thicker power range ring indicates a relatively larger amount of available bandwidth for client stations located within the area defined by the ring, while a thinner power range ring indicates a relatively lower amount of available bandwidth for client stations located within the area defined by the ring. The appearances of the access point representations and associated power range rings are further indicative of the radio frequency channels on which the corresponding access point devices are currently operating. For example, the access point representation 70 may be displayed in a first predetermined color associated with a corresponding radio frequency channel, indicating that the corresponding access point device is operating within that radio frequency channel.

Similarly, since the multi-band access point representation 72 may correspond to a "dual mode" access point device, thus including two independent sets of radio circuitry, each of which can independently operate using a separate radio frequency band. Accordingly, each of the conjoined access point representations 74 and 76, and their associated power range rings may be represented to visually indicate the respective colors associated respectively with two different radio frequency channels that currently being used by the corresponding access point.

Each access point representation may further include textual information. For example, the access point representation 70 includes text 65 indicating the specific channel ("153") that the corresponding access point device is currently operating on, text 67 indicating the wireless LAN protocol used ("a" for 802.11a) by the corresponding access point device, and the last three characters of the MAC (Media Access Control) address ("300") of the corresponding access point.

The specific appearance, such as diameter, width, color and textual information, for each access point representation and associated power range ring may be determined in part response to configuration and setting information determined from the corresponding devices, for example by way of SNMP requests for MIB values stored in the devices. Such configuration information may include the type of wireless communication protocol supported and/or enabled in the device, such as one of the IEEE 802.11a, 802.11b or 802.1 µg protocols. The configuration and setting information determined from the devices may also include a current transmit power setting for the device, current channel, or other information that may be used to determine the appearance of the access point representations and power range rings. User provided information may also or alternatively be used to determine in part or completely how the access point representations and power range rings are represented, as described below with reference to FIG. 20.

Figure 5:
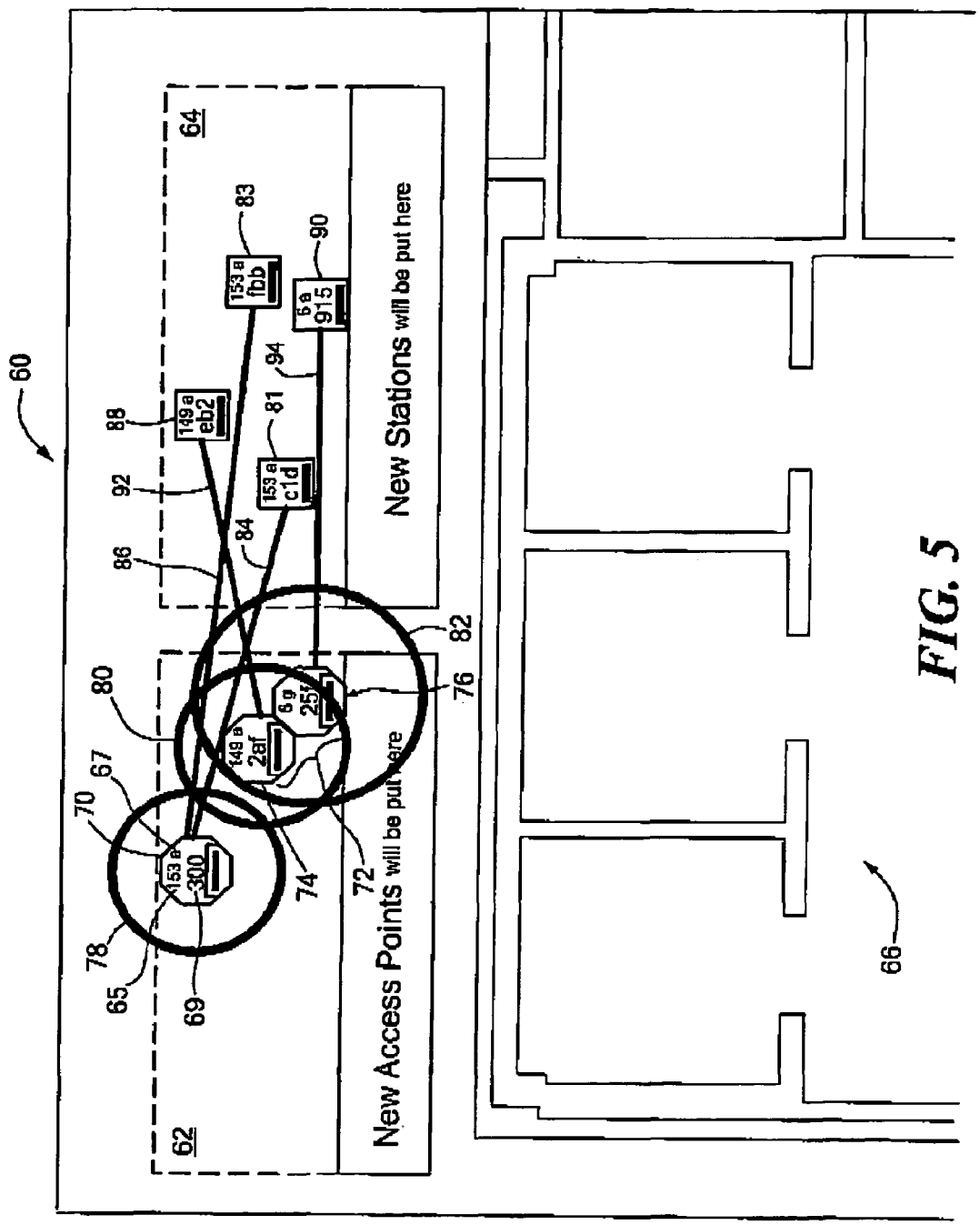
FIG. 5 shows a portion of a user interface display including a number of graphical representations of client station devices associated with the access point devices corresponding to the access point representations of FIG. 4.

FIG. 5 shows a portion 60 of a user interface display including a number of client station representations for corresponding client station devices that are associated with the access point devices corresponding to the access point representations of FIG. 4. As shown in FIG. 5, client station representations 80 and 82 correspond to client station devices associated with the access point device corresponding to access point representation 70. The associations between these wireless network devices are represented by the association lines 84 and 86. A client station representation 88 corresponds to a client station device associated with the radio frequency band circuitry represented by the access point representation 74 within the conjoined access point representation 72 for the multi-band access point device. As noted above, the conjoined access point representation 72 may correspond to what is sometimes referred to as a dual mode access point device. The association between the client station device corresponding to the client station representation 88 and the radio frequency band circuitry represented by the access point representation 74 within the conjoined access point representation 72 is represented by the association line 92. A client station representation 90 corresponds to a client station device associated with the radio frequency band circuitry represented by the access point representation 76, also within the conjoined access point representation 72. The association between the client station device corresponding to the client station representation 90 and the radio frequency band circuitry represented by the access point representation 76 within the conjoined access point representation 72 is represented by the association line 94. The client station representations of FIG. 5 are shown within the second display region 64. The client station devices corresponding to the client station representations of FIG. 5 may, for example, be identified based on associated client list data obtained from the access point devices they are associated with. Accordingly, such information within those associated client lists may similarly be used to provide the association lines between the device representations as shown in FIG. 5.

The association lines provided between the client station and access point representations of FIG. 5 are formatted to visually indicate the amount of available bandwidth between the corresponding access point and client station devices, as well as the currently selected radio frequency channel being used to communicate between the devices. For example, the width of an association line may be used to indicate the amount of available bandwidth between the devices corresponding to the graphical device representations connected by the association line. In such an embodiment, a relatively thick association line may be used to represent a relatively large amount of available bandwidth between the corresponding devices, while a relatively thin association line may be used to represent a relatively small amount of available bandwidth between the corresponding devices. Similarly, the format of the association lines in FIG. 5 may be used to visually indicate a current radio frequency channel being used to communicate between the devices corresponding to the graphical device representations the connect. For example, the color of the association lines may indicate which radio frequency channel is currently being used to communicate between the devices corresponding to the graphical device representations they connect. Other association line format characteristics may alternatively be used to visually distinguish between higher and lower amounts of available bandwidth between corresponding devices, and/or between radio frequency channels currently being used to communicate between the corresponding devices.

Figure 6:
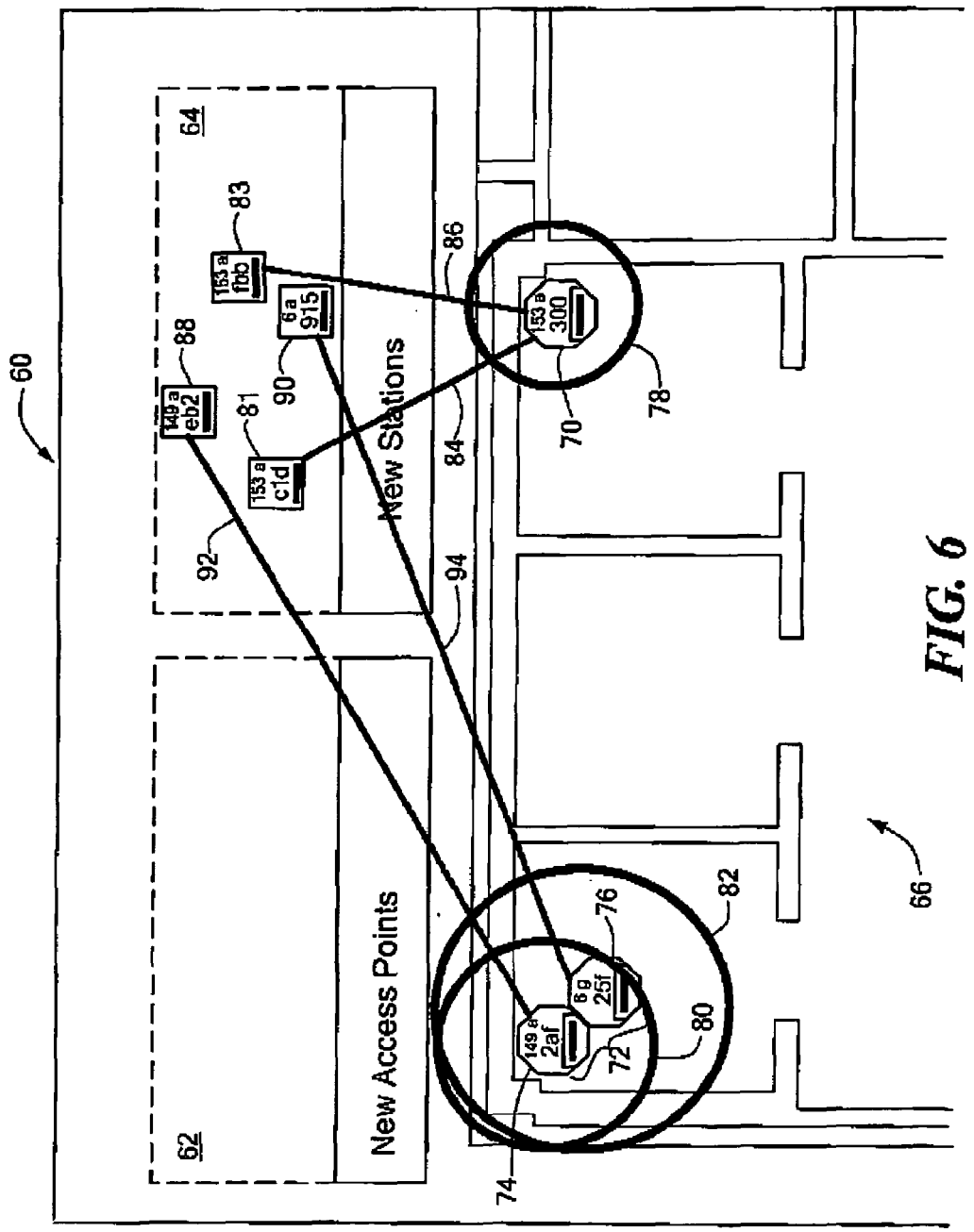
FIG. 6 shows a portion of a user interface display resulting from a user causing the access point representations of FIG. 5 to be moved into the physical space display region.

FIG. 6 shows the portion 60 of a user interface display resulting from a user moving the access point representations of FIG. 5 into the physical space display region. As shown in FIG. 6, the access point representations 70 and the conjoined access point representation 72 have been moved into the physical space display region 66. The physical space display region 66 shows a graphical representation of a physical environment for the managed wireless network. The power range rings 78, 80 and 82 have also been moved into the display region 66, maintaining their respective access point representations at their centers. For example, the access point representation 70 and the conjoined access point representation 72 may have been moved into specific locations within the physical space display region 66 in response to a user clicking and dragging them to those locations using a computer mouse interface device or the like. In this way, the disclosed system enables a user to position the graphical representations of wireless network devices at points within the physical space display region 66 corresponding to actual physical positions of the devices in the network deployment environment.

Figure 7A:
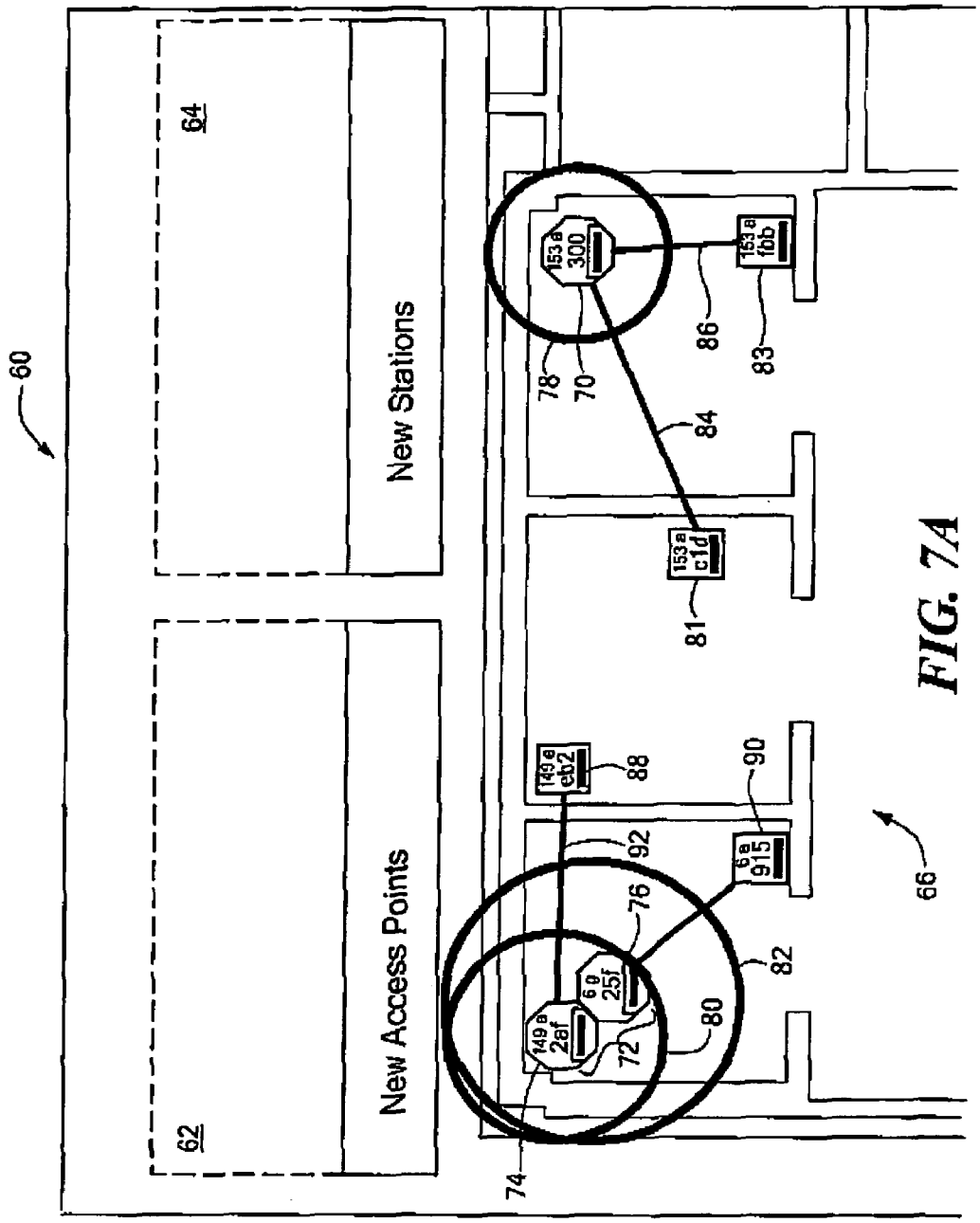
FIG. 7A shows a portion of a user interface display showing client station representations having been moved into the physical space display region.

FIG. 7A shows the portion 60 of a user interface display with client station representations having been moved into the physical space display region. As shown in FIG. 7, the client station representations 80, 82, 88 and 90 have been moved into the physical space display region 66, which shows the execution environment for the managed wireless network. The association lines 84, 86, 92 and 94 have been maintained between their respective device representations. For example, the client station representations 80, 82, 88 and 90 may have been moved into specific locations within the physical space display region 66 in response to a user clicking and dragging them to those locations using a computer mouse interface device or the like. In this way, the disclosed system enables a user to position the graphical representations of wireless network devices at points within the physical space display region 66 corresponding to the actual physical positions of these devices. Alternatively, the disclosed system may allow a user to request that the disclosed system automatically position the client station representations from the second display region 64 within the physical space display region 66. Such auto-positioning may, for example be performed based on predetermined or preset positioning parameters, such as a predetermined distance within the physical space display region 66 at which client station representations are to be placed from the access point representations corresponding to access point devices with which the corresponding client stations are associated.

Figure 7B:
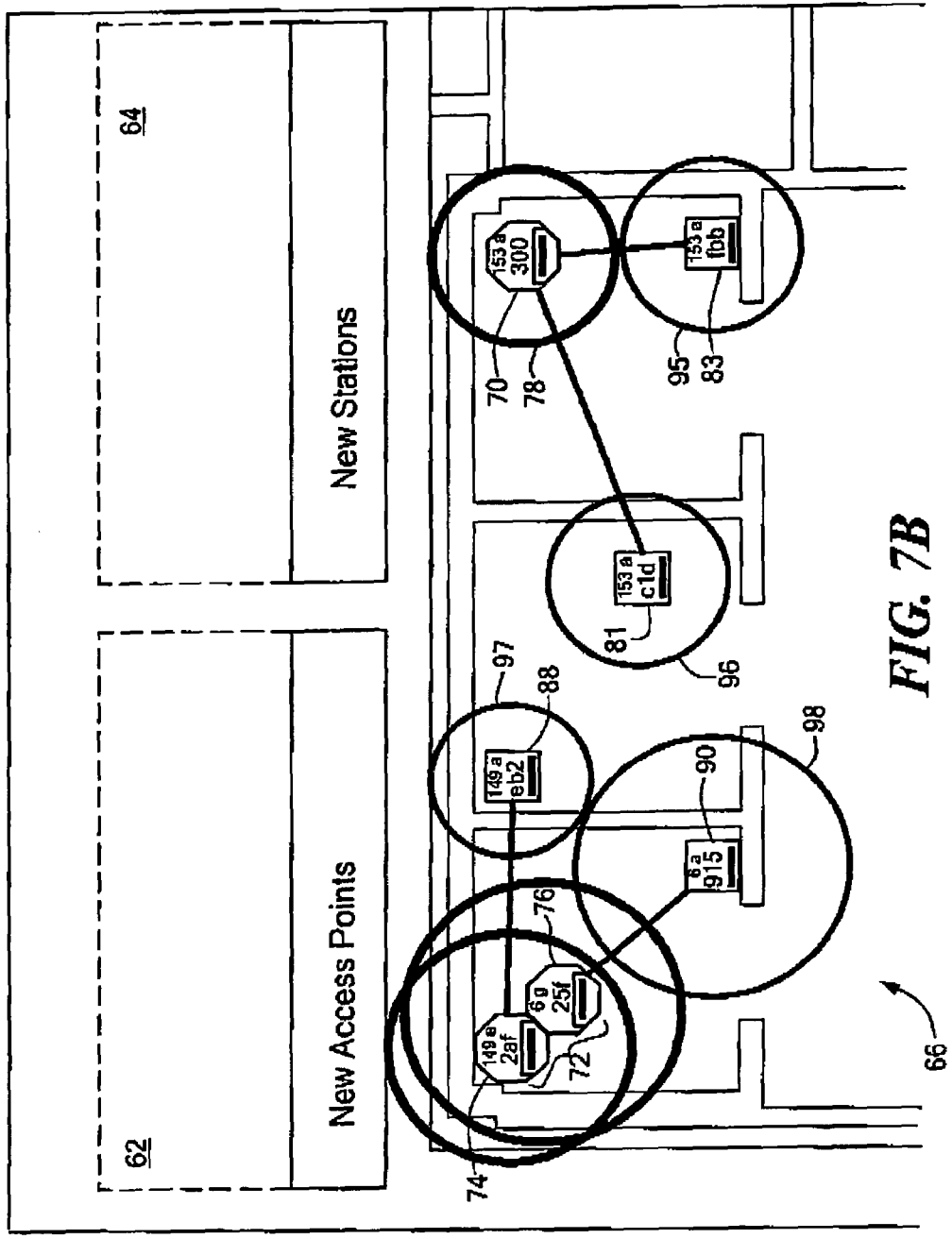
FIG. 7B shows a portion of a user display showing client station representations with power range rings.

FIG. 7B shows power range rings 95, 96, 97 and 98 for respective client station representations 80, 82, 88 and 90. The power range rings shown in FIG. 7B represent the same radio frequency domain characteristic of corresponding client station devices as access point representation power range rings do for corresponding access point devices. Accordingly, the diameter of each of the power range rings 95, 96, 97 and 98 may represent a physical area of radio signal coverage within the physical space shown in the physical space display region, the thickness of each of the power range rings 95, 96, 97 and 98 may represent an amount of potential bandwidth within that physical area within the ring, and the color of each of the power range rings 95, 96 97, and 98 may represent the radio frequency channel currently in use by the corresponding client station device.

Figure 8:
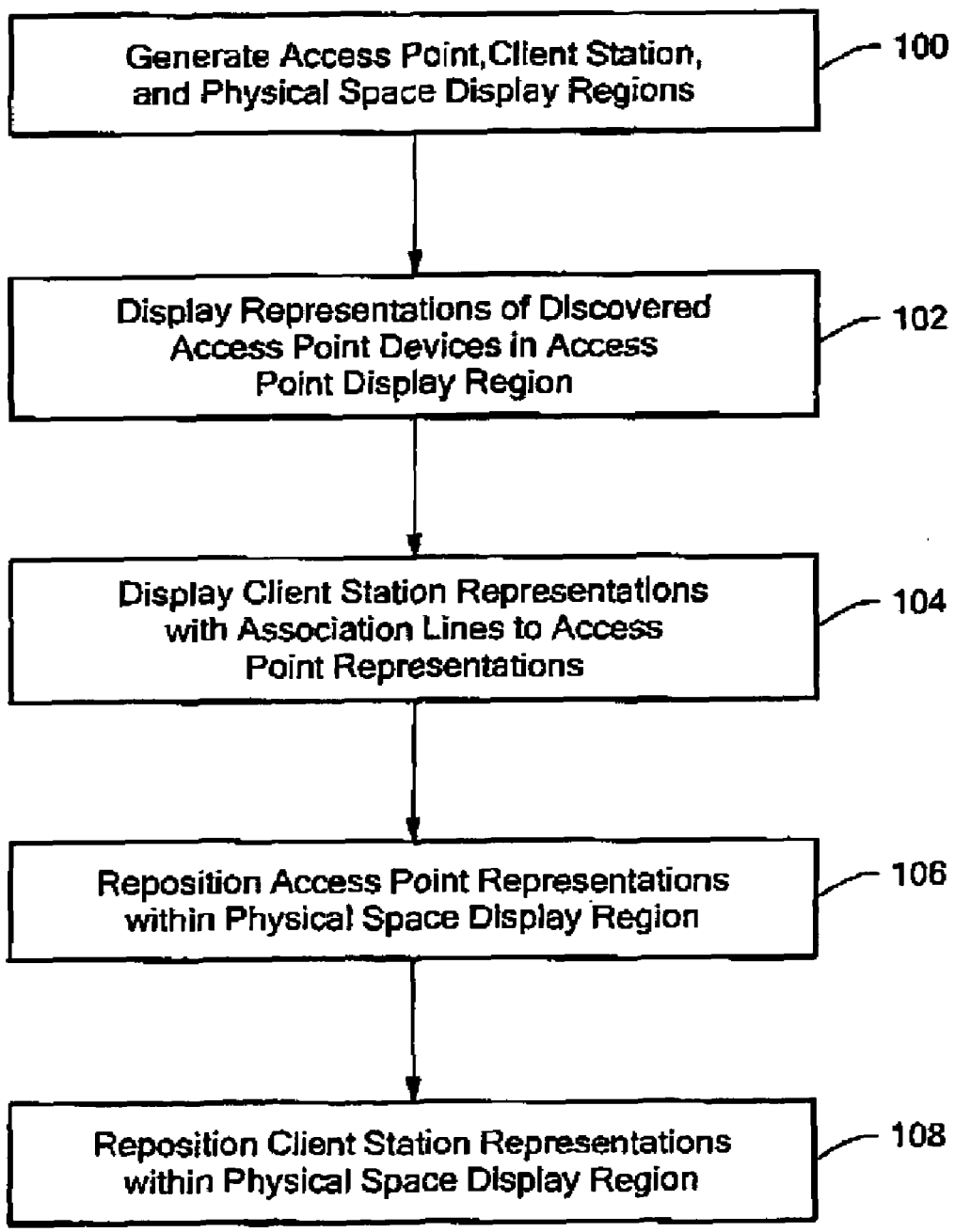
FIG. 8 is a flow chart showing steps performed in an illustrative embodiment to provide a user interface display including graphical representations of access point and client station devices in a wireless communication network.

FIG. 8 is a flow chart showing steps performed in an illustrative embodiment to provide a user interface display including access point and client station representations. At step 100, the disclosed system generates access point, client station, and physical space display regions within a portion of the graphical user interface. At step 102, the disclosed system displays access point representations of discovered access point devices within the access point display region, including power range rings as appropriate. At step 104, client station representations are generated, also including power range rings as appropriate, for client station devices associated with the discovered access point devices corresponding to the access point representations generated in step 102. Association lines are further provided at step 104 between representations of associated access point and client station devices. At step 106, the disclosed system operates to reposition the access point representations from the access point display region to the physical space display region. The repositioning performed at step 106 may, for example, be performed responsive to a user clicking and dragging the access point representations from the access point display region into the physical space display region.

At step 108, the disclosed system operates to reposition the client station representations from the client station display region to the physical space display region. The repositioning performed at step 108 may, for example, be performed responsive to a user clicking and dragging the client station representations from the client station display region into the physical space display region. Alternatively, the repositioning at step 108 may be automatically performed by the disclosed system based on a number of auto-positioning parameters, such as distance from associated access point representation. The association lines generated at step 104 are maintained between the representations of associated devices in the repositioning provided at step 108.

FIGS. 9 through 12 illustrate a sequence of events in which access point representations graphically indicate which of the corresponding access point devices are currently operating, currently not operating, currently in a standby mode, and are manageable using the wireless communication network management program 20 of FIG. 1.

Figure 9:
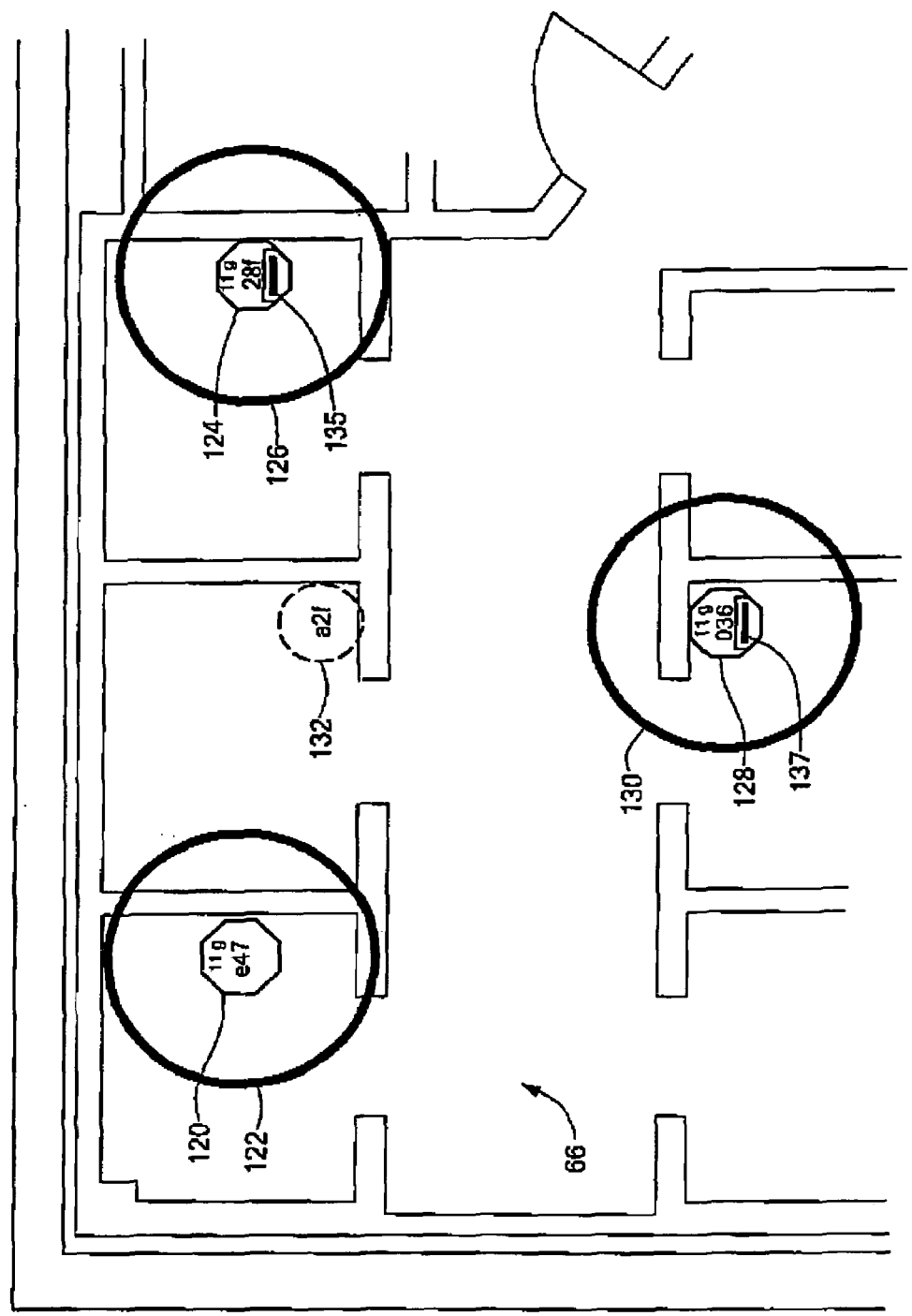
FIG. 9 shows a portion of a user interface display including graphical representations of access point devices that are currently powered on and operating, including a representation of one access point device that is currently inoperable or powered off.

FIG. 9 shows a portion 60 of a user interface display including graphical representations 120, 124 and 128 of access point devices that are currently operating, and a graphical representation 132 of an access point device that is currently not operating, all shown in the physical space display region 66. For example, the access point device corresponding to the access point representation 132 may currently be powered down, have failed, or otherwise not currently inoperable. The representations 120, 124 and 128 for the currently operating access point devices are shown having respective power range rings 122, 126 and 130, while no power range ring is provided for the representation 132 of the access point device that is not currently operating. The access point representations 120, 124 and 128, and the respective power range rings 122, 126 and 130, may further be visually indicative of the radio frequency channel on which they are currently operating. For example, the color of each one of the access point representations 120, 124 and 128 and respective power range rings 122, 126 and 130 may be selected to indicate an associated radio frequency channel on which the corresponding access point device is operating. The access point representations 124 and 128 visually indicate that the corresponding access point devices are manageable using the wireless communication network management program 20 of FIG. 1. For example, the access point representations 124 and 128 include manageability bars 135 and 137 respectively, which indicate their manageability in this regard. In contrast, the access point representation 120 visually indicates that it is not manageable using the wireless communication network management program 20 of FIG. 1. For example, the access point representation 120 indicates it lack of manageability in this regard through its lack of any such manageability bar. The manageability bars 135 and 137 may further include text or a symbol identifying the wireless network management program 20, such as a name associated with the wireless communication network management program 20. Alternatively, any other appropriate visual indication may be used to graphically indicate which access point representations correspond to access point devices that are manageable through the wireless communication network management program 20.

Figure 10:
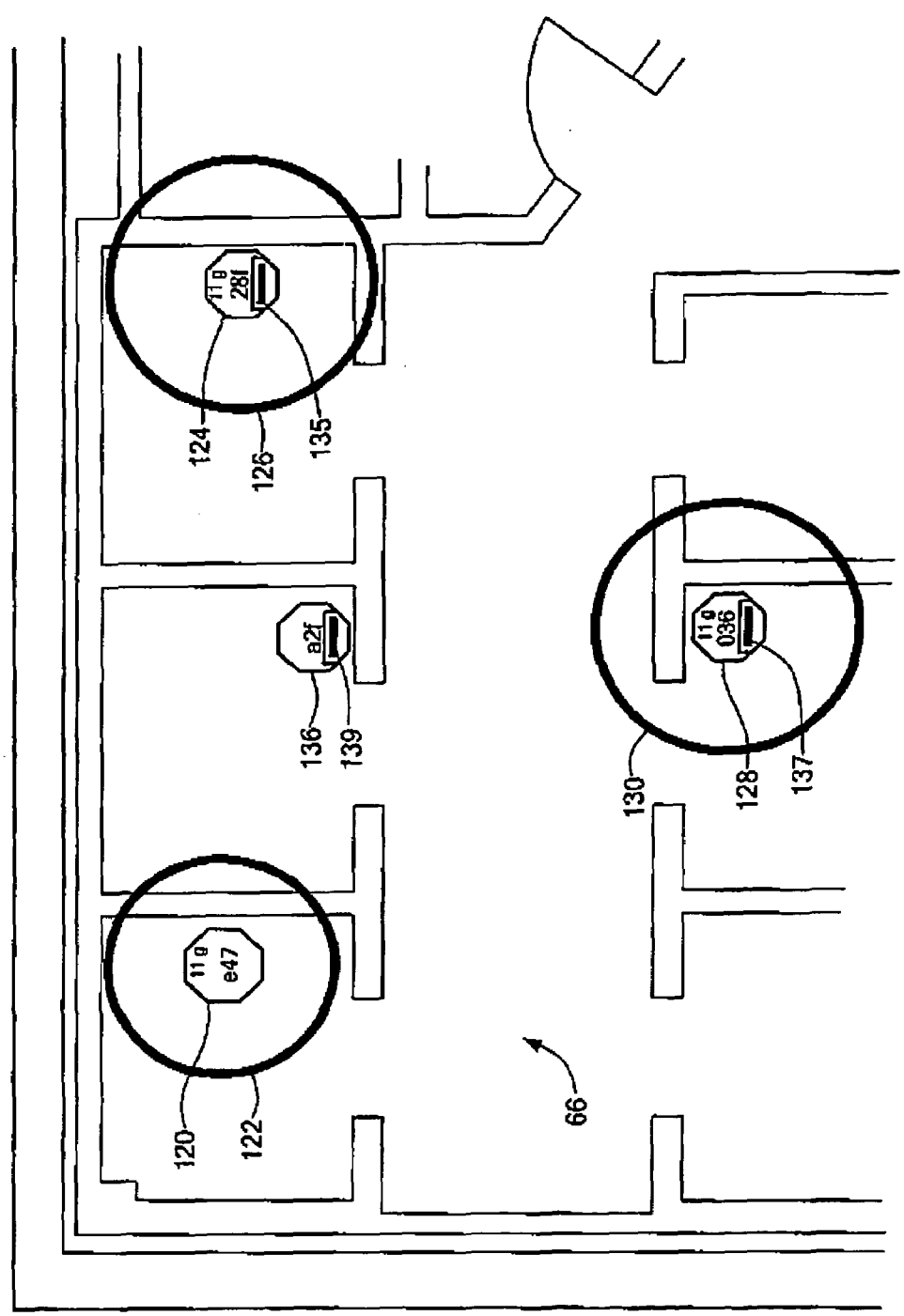
FIG. 10 shows a portion of a user interface display including a graphical representation of an access point device that has transitioned into a standby mode.

FIG. 10 shows the portion 60 of a user interface display including an access point representation 136 visually indicating that the access point device corresponding to the access point representation 132 of FIG. 9 is no longer inoperable, but has transitioned into an active standby mode. For example, the access point representation 136 may be generated using a distinctive, predetermined color, such as black, in combination with an absence of any associated power range ring, to visually indicate that the corresponding access point device is currently in standby mode. Alternatively, any other specific visual indication may be used to distinctively represent access points currently in a standby mode. The access point device corresponding to the access point representation 136 may enter the standby mode, for example, after it initially becomes operable, and detects that it is within such close physical proximity to one or more other access point devices that radio frequency communication interference between access point devices would result if it were to become operational. Accordingly, while in the standby mode, the access point device corresponding to the access point representation 136 periodically determines whether any proximate access point devices have either moved or become inoperable, such that it would be able to become operable without resulting in interference between access point devices. Additionally, the access point representation 136 includes a manageability bar 139 indicating that it is manageable by the wireless communication network management program 20 of FIG. 1.

Figure 11:
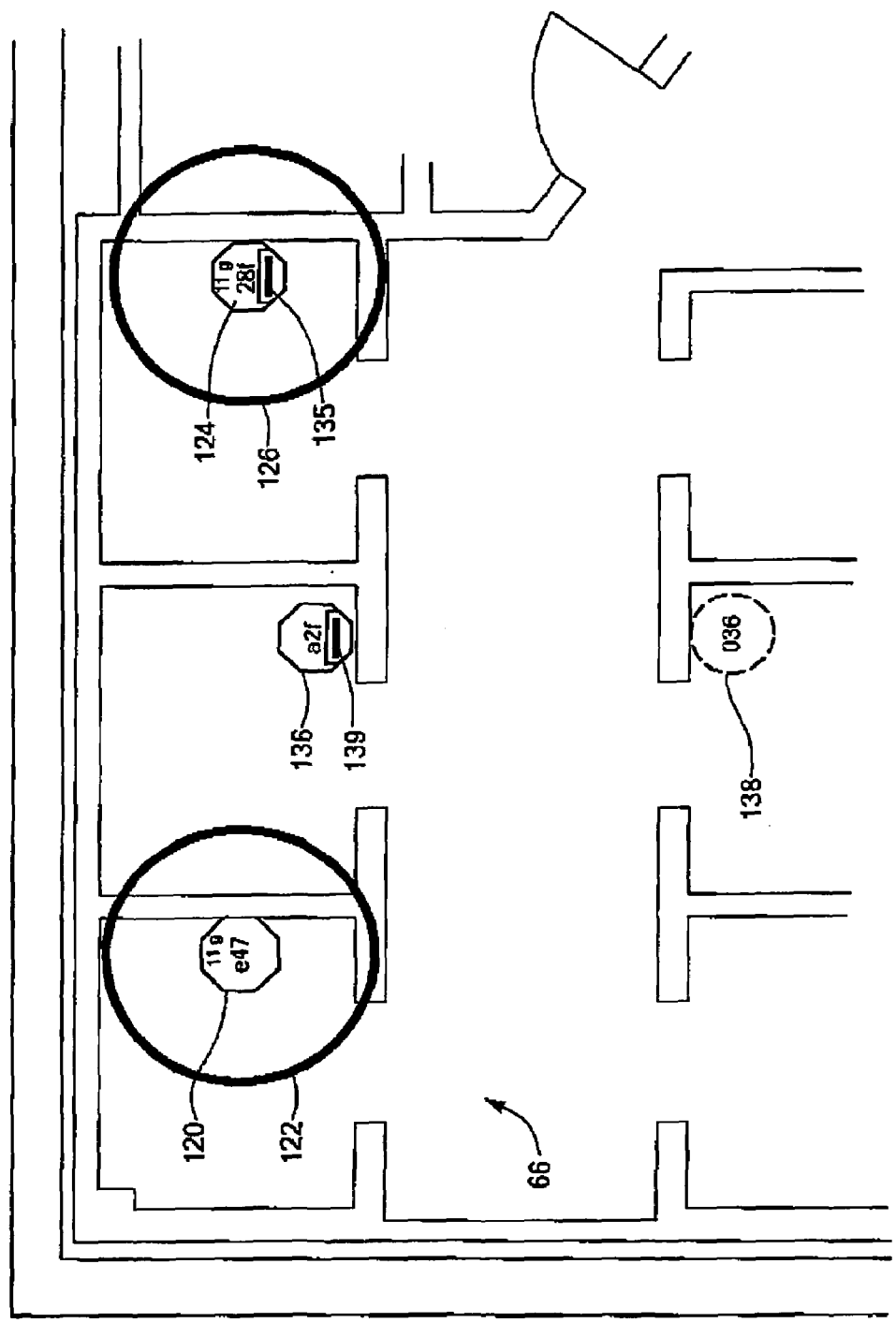
FIG. 11 shows a portion of a user interface display including a graphical representation of a previously operating access point device that has failed or otherwise stopped operating.

FIG. 11 shows the portion 60 of a user interface display, including an access point representation 138 corresponding to the same access point device as the access point representation 128 of FIG. 9. The access point representation 138 is visually indicative, for example by its dashed line format and circle shape, of the fact that the corresponding access point device has now stopped operating, for example as a result of a device failure or other event. While in the standby mode, the access point device corresponding to the access point representation 136 determines that the access point device corresponding to the access point representation 138 has become inoperable. Because the access point device corresponding to the access point representation 138 has become inoperable, the access point device corresponding to the access point representation 136 determines that it can become operable without causing interference between access point devices. Accordingly the access point corresponding to access point representation 136 transitions from the standby mode into operational mode, as illustrated in FIG. 12.

Figure 12:
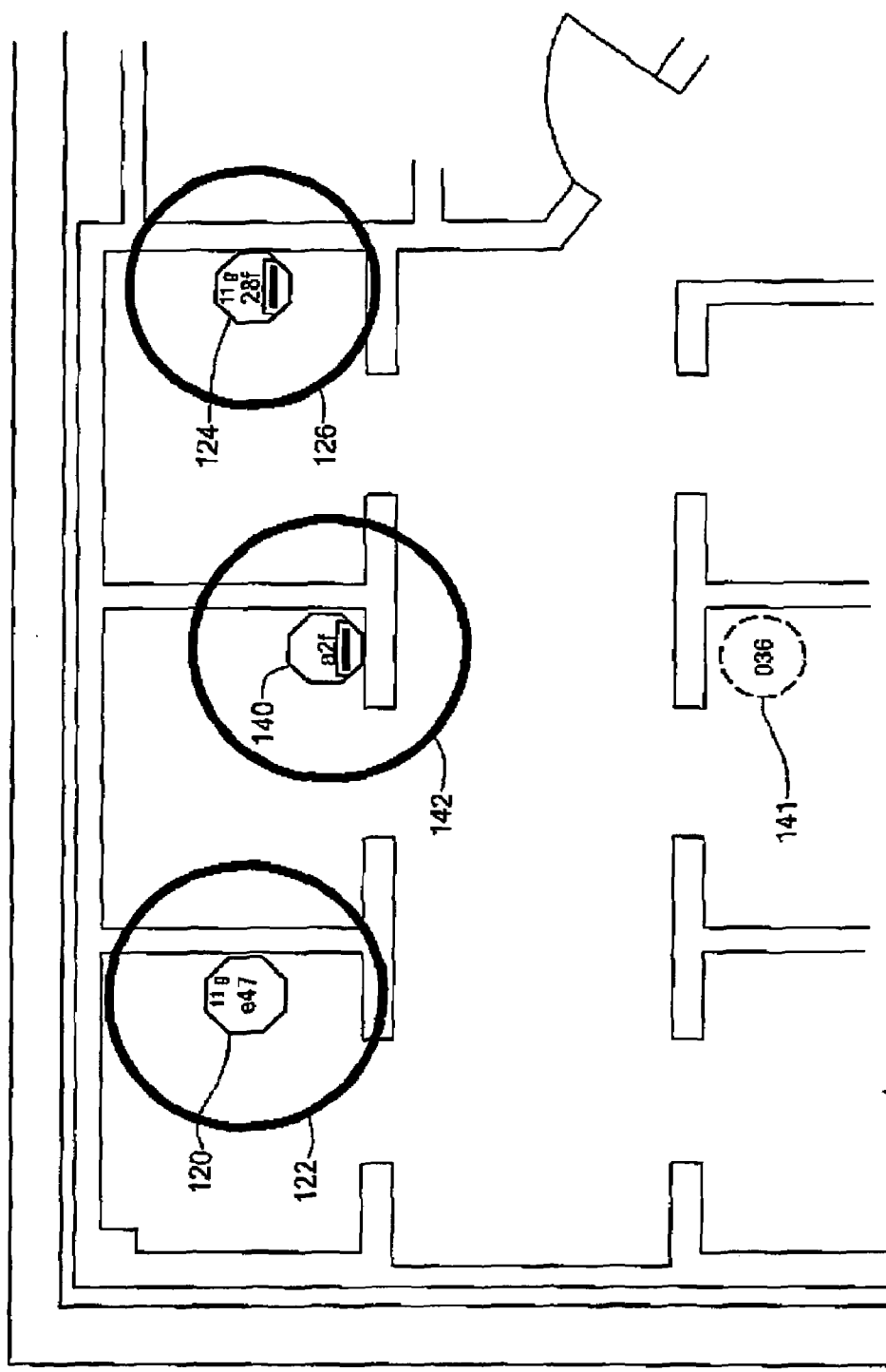
FIG. 12 shows a portion of a user interface display including a graphical representation of an access point device that was previously in a standby mode, and that has transitioned into an operating state.

FIG. 12 shows the portion 60 of the user interface display including a representation 140 of the access point device that was previously in standby mode, and corresponding to the access point representation 136 of FIG. 11, and that has transitioned to an operational state. The access point representation 140 for the now operational access point device is further displayed with power range ring 142.

Figure 13:
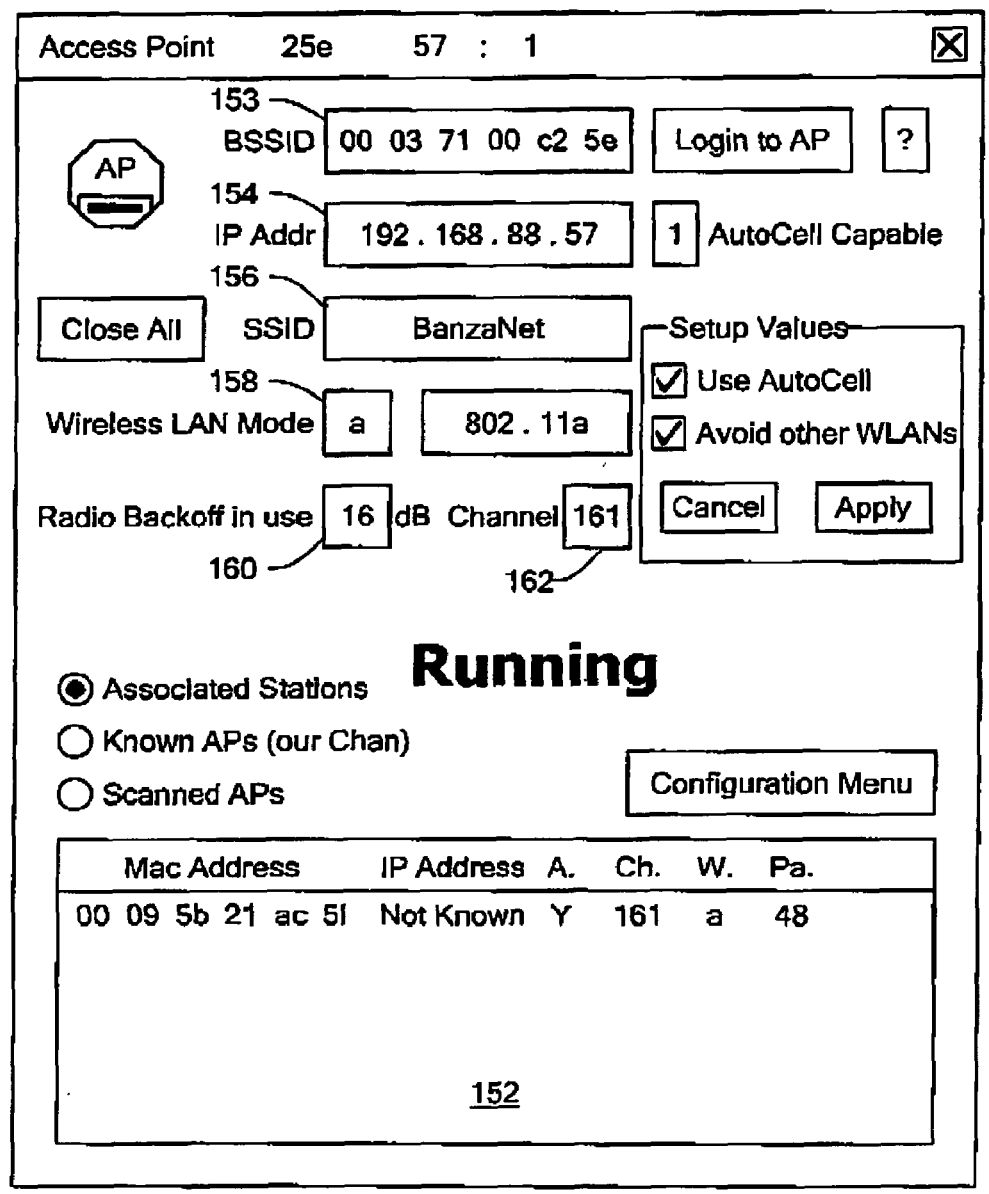
FIG. 13 shows a portion of a user interface display providing user access to properties of an access point device through a representation of the access point device.

FIG. 13 shows a portion 150 of a user interface display providing user access to properties of an access point. The display portion 150 may be accessed through an access point representation of the corresponding access point, as a result of one or more mouse clicks, right mouse clicks and/or other user indications of selection of the access point representation. The BSSID (Basic Service Set Identifier) field 153 contains an 802.11 identifier for the access point device, such as the device's MAC (Media Access Control) address of the device. The IP (Internet Protocol) address 154 field contains the IP address being used by the device. The SSID (Service Set Identifier) field 156 contains a text name associated with the wireless network under management. The wireless LAN mode fields 158 and 159 are used to indicate the short ("a") and long ("802.11a") names for the wireless communication protocol used by the associated device. The Radio Back-off in use field 160 indicates the amount (16 dB) by which the access point device has reduced the transmit strength of its radio circuitry for performance purposes. The channel field 162 indicates the radio frequency channel currently in use (161) by the device. The list box 152 can show one of the following lists:

1) Associated Stations—client stations that are currently associated with the access point device.
2) Known Access Points—other access point devices that can be heard by the access point device, for example on the selected channel shown in 162 and/or some other channel.

In the example of FIG. 13, the list box 152 shows characteristics of a number of listed associated client stations. The columns shown in the list box 152 are shown, for example, including the following information for each client station associated with the access point:

MAC Address—MAC address of the associated client station;
IP Address—IP address of the associated client station;
Manageable flag—Y for manageable using the or N for non-manageable;
Channel—The channel that the associated client station is currently using for transmits and receives;
WLAN Mode—an indication of the wireless protocol in user, for example "a"= indicates that the 802.11a is in use by the associated client station; and Path Lost—The amount (dB) of radio signal lost between the associated client station and the access point.

Figure 14:
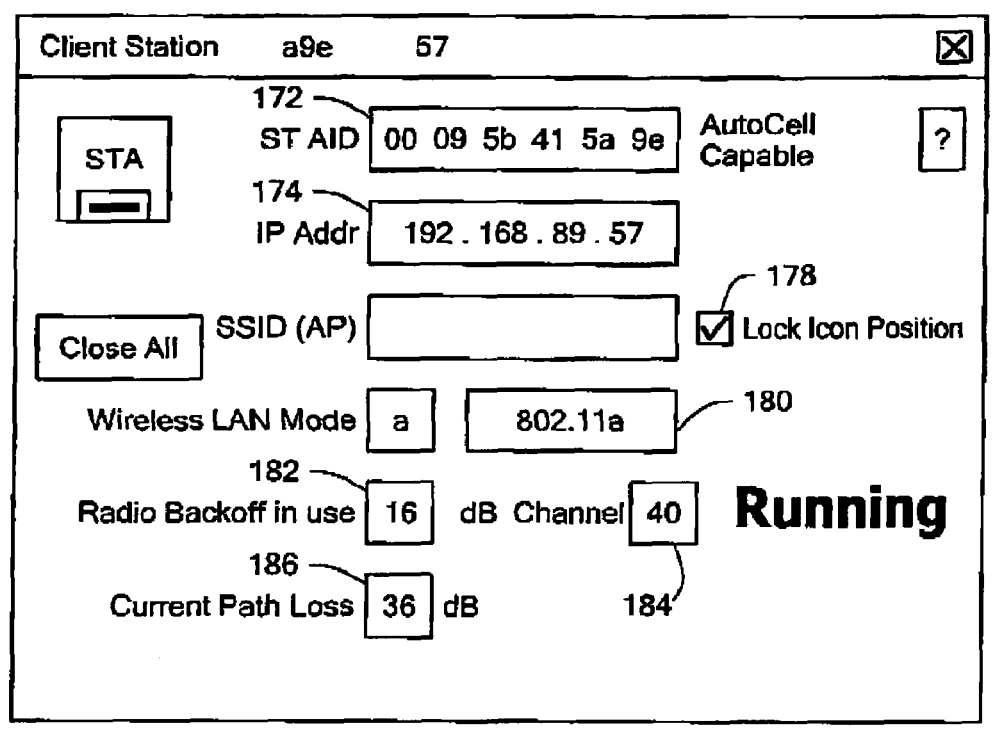
FIG. 14 shows a portion of a user interface display providing user access to properties of a client station device.

FIG. 14 shows a portion 170 of a user interface display providing user access to properties of a client station device. The portion 170 may be accessed through a client station representation of the client station device, as a result of one or more mouse clicks, right mouse clicks and/or other indications of selection by the user of the client station representation. The STA ID field 172 displays the MAC address or other identifier of the client station. The IP Addr field 174 displays the IP address of the client station. The SSID field 176 displays the SSID (Service Set Identifier) for the access point device that the client station is currently associated with. In the case where there is no associated access point device for the client station, this field is empty. The Lock Icon position check box 178 enables a user to lock the position of the client station representation for the client station device within the physical space display region by clicking on the check box. This enables a user to exclude a client station representation from an auto-positioning function used to position client station representations at a predetermined distance from the access point representations of access point devices with which the corresponding client station devices are associated. The Wireless LAN Mode fields 180 display the short (e.g. "a") and long (e.g. "802.11a") form identifiers for the wireless communication protocol in use by the client station. The Radio Back-off in use field 182 stores the amount (dB) by which the client station device has reduced the transmit strength of its radio transmitter. In an exemplary embodiment, access point and/or client station devices automatically change the transmit strength of their radio transmitters in order to avoid interference with other devices. The Current Path loss field 36 displays the reduction of signal power (dB) that an arriving radio signal has experienced from the currently associated access point device. The channel field 184 displays the radio frequency channel currently in use by the client station device.

Figure 15A:
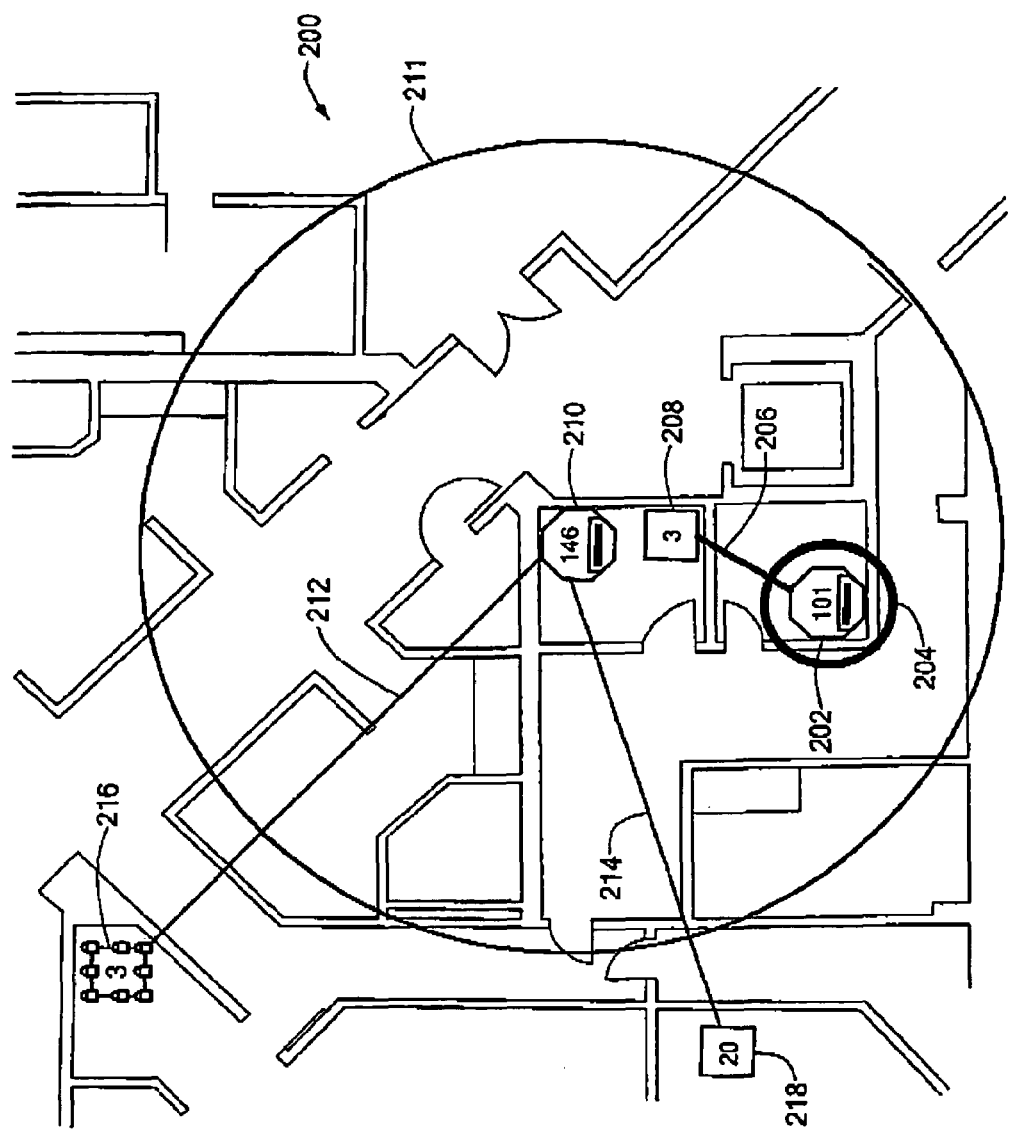
FIG. 15A shows a portion of a user interface display including graphical representations of access point devices indicating areas of radio coverage, available radio bandwidth, and radio channel selection for those access points, with association lines provided between the access point and client station representations of representing available bandwidth between the corresponding associated devices.

FIG. 15A shows a portion 200 of a user interface display including representations 202, 210 of access point devices, each having respective power range rings 204, 211 indicating areas of coverage, available bandwidth, and channel selection for those access point devices. As noted above, a relatively thick power range ring is indicative of a relatively larger amount of available bandwidth within the ring, while a relatively thin power range ring is indicative of a relatively smaller amount of available bandwidth within the ring. For example, the thickness of the power range ring 211 is indicative of the available bandwidth provided by the access point device corresponding to the access point representation 210 for client station devices located within the area of the physical space encompassed by the power range ring 211. Similarly, the thickness of the power range ring 204 is indicative of the available bandwidth provided by the access point device corresponding to the access point representation 202 for client station devices located within the area of the physical space encompassed by the power range ring 204. As shown in FIG. 15A, the available bandwidth within the relatively small-diameter and relatively thicker power range ring 204 is relatively large in comparison to the available bandwidth within the relatively large-diameter and relatively thinner power range ring 211.

The association lines 206, 212 and 214 between the access point and client station representations indicate amounts of available bandwidth between the corresponding associated wireless devices. For example, the thickness of the association line 212 indicates, by its relative thickness, the available bandwidth between the access point device corresponding to the access point representation 210 and the client station device corresponding to the client station representation 216. The association line 214 similarly indicates the available bandwidth between the access point device corresponding to the access point representation 210 and the client station device corresponding the client station representation 218. Also, the thickness of the association line 206 indicates the available bandwidth between the access point device corresponding to the access point representation 204 and the client station device corresponding to the client station representation 208. Accordingly, as visually indicated by the relative thickness of the association line 206 versus the relative thinness of the association lines 212 and 214, the client stations corresponding to the client station representation 208 has a relatively larger amount of bandwidth available for communication with the access point device corresponding to the access point representation 202 than the client station devices corresponding to the client station representations 216 and 218 have with the access point device corresponding to the access point representation 210. The colors of the access point representations, power range rings, and client station representations may be used to indicate the current radio frequency channels being used to communicate between the corresponding wireless devices.

The client station representation 216 in FIG. 15A indicates, for example by way of a number of padlock graphics on it, that the user has indicated that it should be excluded from auto-positioning. Accordingly, if an auto-positioning function is invoked by the user, the client station representation 216 will not be moved from its current position in the display.

Figure 15B:
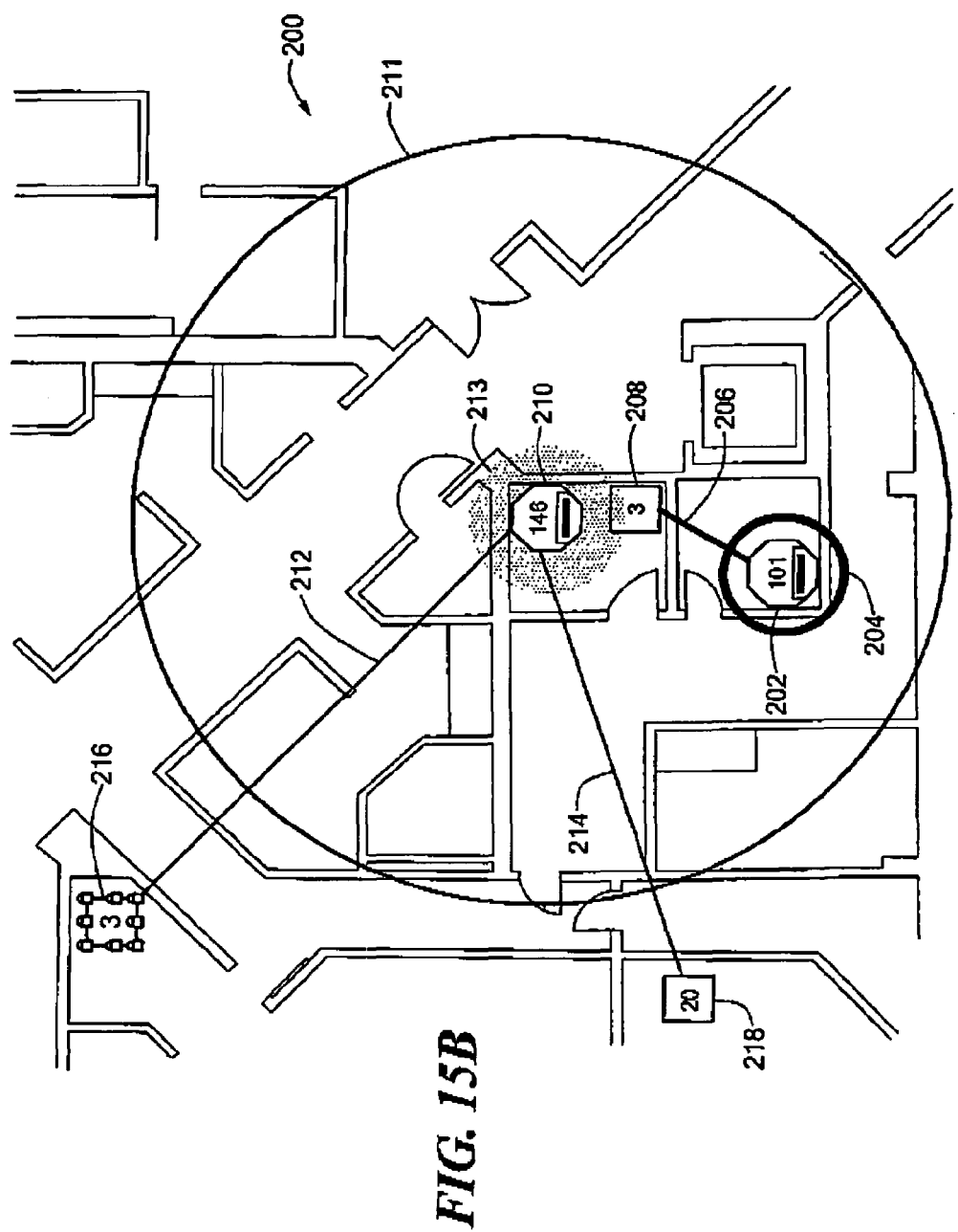
FIG. 15B shows a portion of a user interface display including a representation of an access point device including a "halo" portion.

FIG. 15B shows an alternative embodiment of the access point representation 210. As shown in FIG. 15B, the access point representation 210 includes a shaded area 213, visually resembling a cloud surrounding the illustrative octagon shape at the center of the access point representation 210. The shaded area 213 assists a user in quickly determining which access point representation a power range ring belongs to, since it more clearly indicates which access point representation octagon shape is at the center of a given power range ring. The color of the shaded area 213 may match the color used to represent the rest of the access point representation, indicating the radio frequency channel currently in use.

Figure 16:
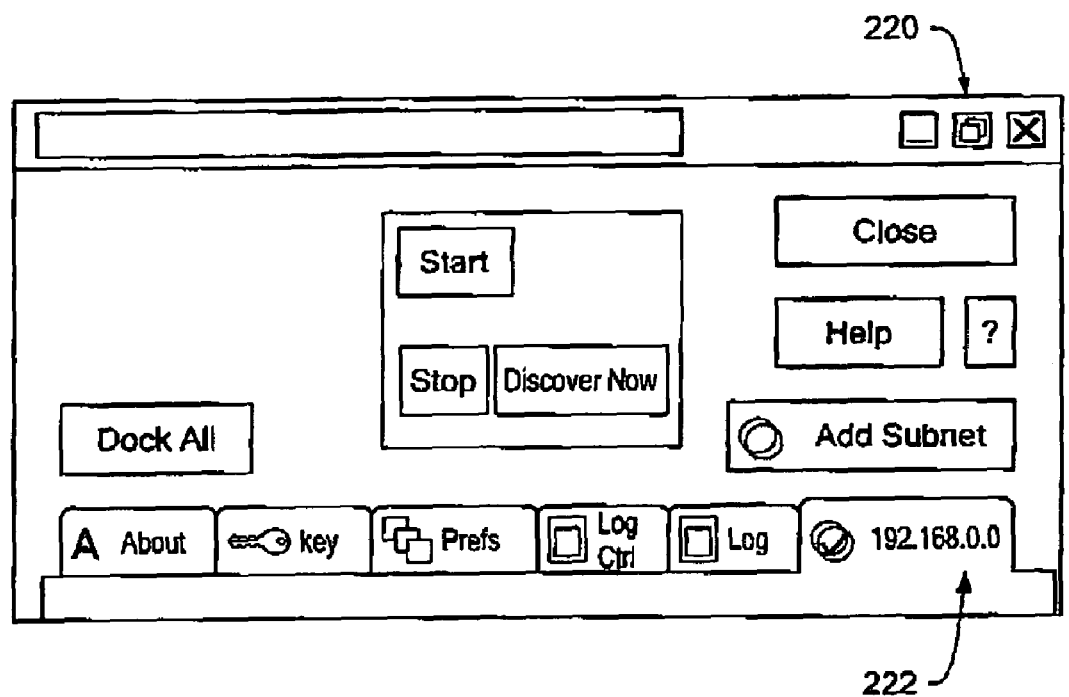
FIG. 16 shows a portion of a user interface display including a main dialog interface window.
Figure 17:
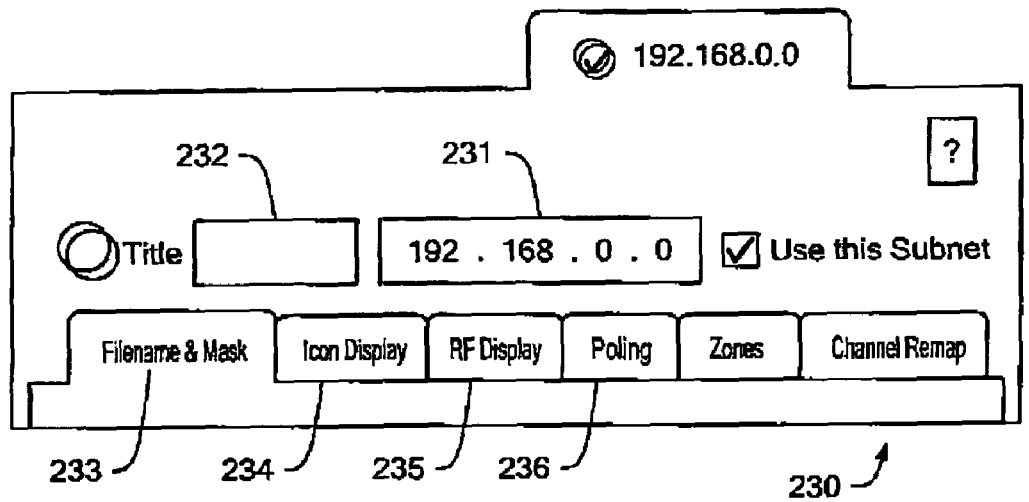
FIG. 17 shows a portion of a user interface display including a subnet display interface window.
Figure 18:
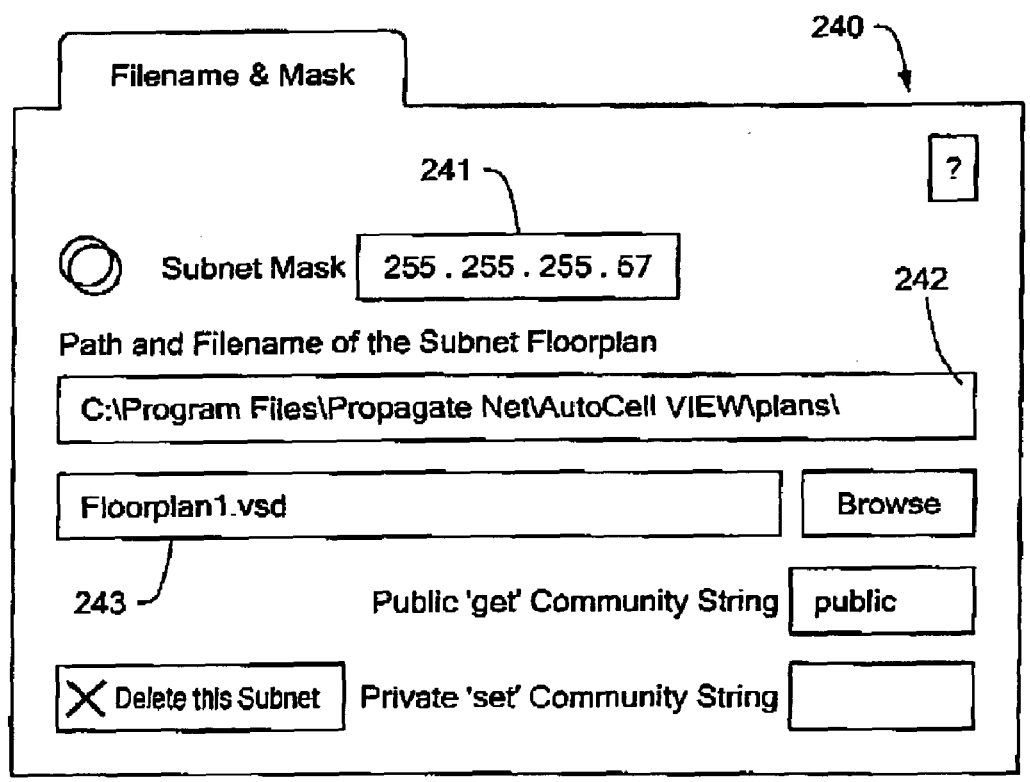
FIG. 18 shows a portion of a user interface display including a file name and mask interface window.

FIG. 16 shows a portion of a user interface display including a main dialog interface window 220. The main dialog window 220 is shown including a number of user selectable tabs, including a subnet display interface tab 222. Upon user selection of the subnet display interface tab 222, for example through a mouse click or other user selection indication, the subnet display interface window 230 of FIG. 17 is displayed. The subnet address field 231 contains a subnet address for use by the disclosed system. A title corresponding to the subnet address can also be entered into the title field 232. When a user selects the filename and mask tab 233, the file name and mask interface window 240 of FIG. 18 is displayed. The filename and mask window 240 includes a subnet mask field 241 for receiving and displaying a subnet mask for the disclosed system. A path field 242 is used to receive a path for a floor plan or other electronic physical space representation to be used, and a filename field 243 is used to receive a name of such a floor plan document.

Figure 19:
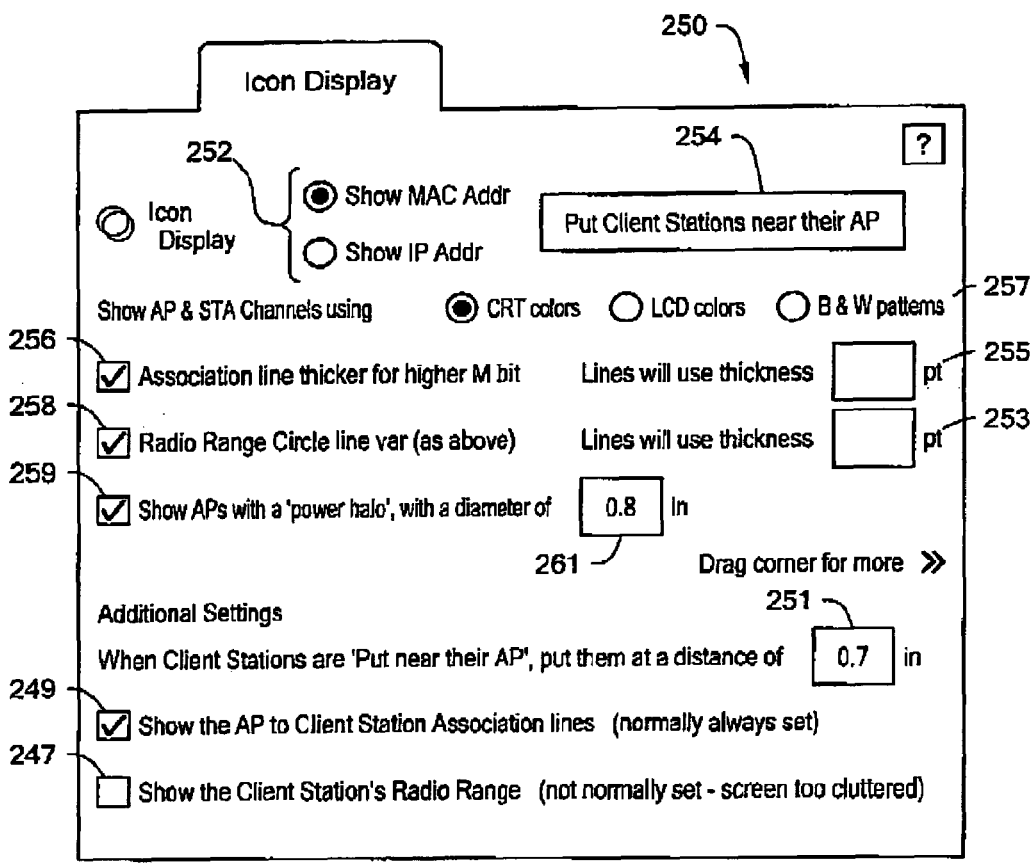
FIG. 19 shows a portion of a user interface display including an icon display interface window.

When a user selects the icon display tab 234 shown in FIG. 17, an icon interface display window 250 is generated, as shown in FIG. 19. The icon interface display window enables a user to indicate various visual aspects of the user interface display with regard to the device representations and association lines. The address display buttons 252 enable the user to indicate whether some portion of the MAC or IP address of a device should be shown in a text portion of its graphical representation. The automatic client station placement button 254 enables a user to indicate that representations of client stations should be automatically placed in physical proximity to the representations of the access point devices with which they are associated. The channel representation buttons 257 enable a user to indicate how radio frequency channels currently in use should be represented in the device representations, power range rings, and association lines. For example, different radio channels may be distinctly represented by respective ones of a set of "CRT" colors, respective ones of a set of "LCD" colors, or by corresponding line formats in black and white patterns. The association line thickness check box 256 enables a user to indicate whether the thickness of association lines should be used to represent the relative amount of available bandwidth between associated devices. The association line thickness value field 257 enables a user to indicate an association line thickness to be used if the association line thickness is not to be used to represent available bandwidth between associated devices. The power range ring thickness check box 258 enables a user to indicate whether the thickness of displayed power range rings is to be used to indicate the amount of bandwidth available to client station devices within them. Similarly, the power range ring thickness value field enables a user to indicate a power range ring thickness to be used if the power range ring thickness is not to be used to represent available bandwidth within the power range rings.

The "power Halo" check box 259 enables a user to indicate an additional visual characteristic, such as a shaded area referred to as a "halo", should be used with access point representations. For example, the disclosed system may be embodied to include a colored shading over a circular area around an access point representation whenever the corresponding access point device is operable. Such a shading may resemble a colored cloud of the same color as used to represent the current radio frequency channel that the device is currently operating on. If the "halo" visual characteristic is enabled, the user may further indicate the diameter of the shaded area to be used in the field 261.

The field 251 enables a user to indicate a distance at which client station representations are to be placed when they are automatically placed near the representations of access point devices with which the corresponding client station devices are associated. The check box 249 enables a user to indicate whether association lines are to be presented between the representations of associated devices, and the check box 247 enables the user to indicate whether power range rings are to be provided around representations of client stations.

Figures 20, 21:
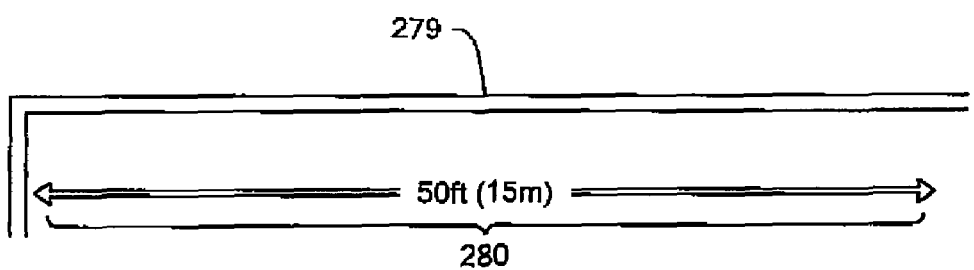
FIG. 20 shows a portion of a user interface display including a radio frequency display interface window.
FIG. 21 shows a portion of a user interface display including a physical space representation scale adjustment display object.

FIG. 20 shows a radio frequency interface display window 260 generated in response to user selection of the radio frequency display tab 235 in FIG. 17. The radio frequency interface display window 260 enables the user to control power ring size. The radio buttons in column 265 enable the user to indicate a device power level to be represented by the power range rings in the display. Each of the of the radio buttons in the column 265 are associated with a row having a first column value 267 indicating an amount of transmit power in dBm (Decibels Below 1 Milliwatt) that is to be represented by the power range rings. A second column value 269 shows the megabits per second available bandwidth corresponding to the transmit power value shown by the first column value 267 using the IEEE 802.11b protocol.

A third column value 271 shows the megabits per second available bandwidth corresponding to the transmit power value shown by the first column value 267 using the IEEE 802.1 μg protocol, and a fourth column value 273 shows the megabits per second available bandwidth corresponding to the transmit power value shown by the first column value 267 using the IEEE 802.11a protocol.

The selected radio button from the column 265 determines the diameter and thickness of the power range rings. A relatively small selected transmit power value in column 267 results in relatively smaller diameter power range rings, while a relatively large selected transmit power value in column 267 results in relatively larger diameter power range rings. This reflects the fact that a higher transmit power enables the radio signals from the wireless devices associated with the power range rings to carry greater amounts of data over greater distances. Accordingly, the disclosed system determines a diameter for each power range ring that corresponds to the distance in the physical space representation, based on scale information provided by the user, that would reflect the throughputs shown for the corresponding transmit power in the selected row. For example, if the radio button for −64 dBm were selected, and a device is being represented that uses IEEE 802.11b technology, the disclosed system generates power range rings having a diameter equal to the distance, in the scale of the physical space representation, that could be traversed using a transmit power of −64 DBm, and providing a maximum throughput of 11 megabits per second using the IEEE 802.11b protocol. If the device being represented is an IEEE 802.11a or 802.11g device, the generated ring would have a diameter equal to the distance, in the scale of the physical space representation, that could be traversed using a transmit power of −64 DBm, and providing a maximum throughput of 54 megabits per second using the IEEE 802.11a or 802.11g protocols.

Similarly, the thickness of each power range ring decreases as the power range ring diameter increases, reflecting a smaller amount of available bandwidth within the area of the physical space representation within the power range ring. Accordingly, the values in columns 269, 271 and 273 increase as the amount of transmit power in column 267 increases. For example, if the radio button in column 265 corresponding to −64 dBm is selected, the generated power range rings would have a relatively smaller thickness indicative of 11 megabits per second for IEEE 802.11b protocol devices, and a relatively greater thickness indicative of 54 megabits per second for IEEE 802.11a and IEEE 802.11g protocol devices. Thus the thickness of each power range ring may be responsive to a user selected amount of radio signal attenuation, and reflects the distance in the physical space representation corresponding to the diameter of the power range ring, and the type of communication protocol used by the associated wireless device. The user may also select the bottom of the six radio button in the column 265, and then enter a value in dBm from −25 to −99 in the adjacent box. The disclosed system then fills in the appropriate available bandwidths for the provided transmit power value for the columns 267, 269, 271 and 273.

FIG. 21 shows a portion 279 of a user interface display including a scale adjustment display object 280, shown for example as a line representing 50 feet in the physical space display region 66 in FIG. 3. The user can adjust the length of the display object 280, for example by clicking and dragging on either end of the line to make the line either shorter or longer. The disclosed system uses the length of the line, as configured by the user, to determine the scale of the representation of the physical space in the physical space display region 66. Alternatively, any other specific user interface technique may be provided for a user to indicate the scale of the physical space representation in the physical space display region 66.

Figure 22:
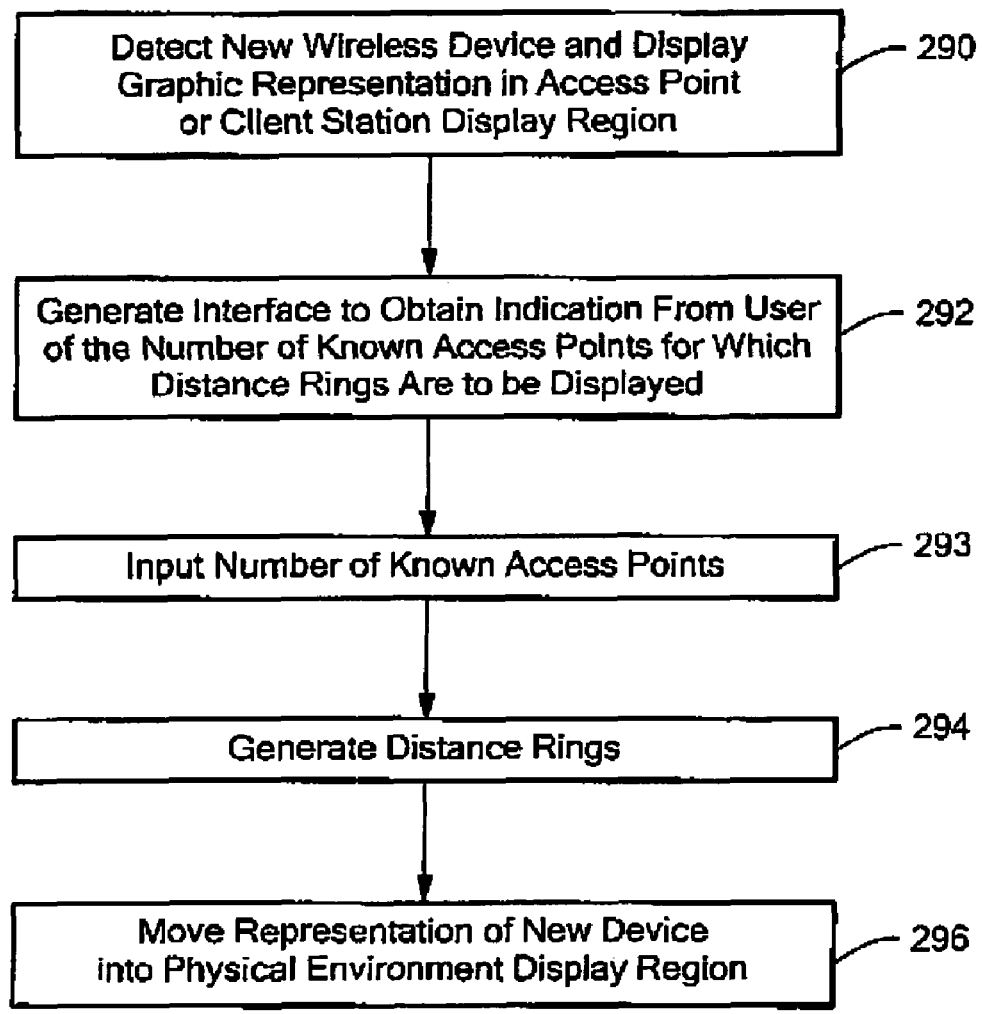
FIG. 22 is a flow chart illustrating steps performed to determine and represent the physical location of a newly detected wireless communication device.

Determining and Representing the Physical Location of a Newly Detected Wireless Network Device FIG. 22 is a flow chart illustrating steps performed by an embodiment of the disclosed system for determining and representing the physical location of a newly detected wireless network device. As shown in FIG. 22, at step 290 the disclosed system detects the presence of a wireless device within the managed wireless network, such as an access point or a client station. For example, a newly detected wireless device may be a "rogue" access point that has been brought into a business organization's network by an employee from home. Or, the newly detected device may have been added to the network by a malevolent actor for purposes of compromising the security of the wireless network. In any case, a system manager may desire to find the physical location of the newly detected device within the physical environment in which the wireless network is deployed.

The newly detected device is initially represented graphically by an icon representation, for example in either the first display region 62 in FIG. 7*b* for showing graphical representations of discovered access point devices, or the second display region 64 in FIG. 7*b* for showing representations of client station devices. This representation of the newly detected device will indicate a wireless communication channel on which the device has been heard by one or more previously deployed, "known" access point devices in the wireless network, for example using a predetermined color or other visual indication associated with the channel.

At step 292 the disclosed system generates an interface that allows a user to indicated the number of known access point devices for which distance rings are to be displayed. The disclosed system selects the known access points that are receiving the strongest transmissions from the newly detected device, up to the number input at step 293 from the interface displayed at step 292, and generates distance rings for representations of those known access points at step 294. The distance rings generated at step 294 may, for example, be overlaid on top of a representation of the physical environment of the wireless network. The diameter of the distance rings generated at step 294 indicates an estimated distance from the associated access point at which the newly detected wireless device is located. The estimated distance may, for example, be determined based on measured signal strengths of one or more transmissions from the newly detected wireless device received by the known access points associated with the respective distance rings.

It will be recognized that even if a newly detected device is not manageable with network management software used to manage the deployed wireless communication network, it will still be heard by previously deployed access points, which will be able to report the channel on which the device is transmitting to the management system.

Figure 23:
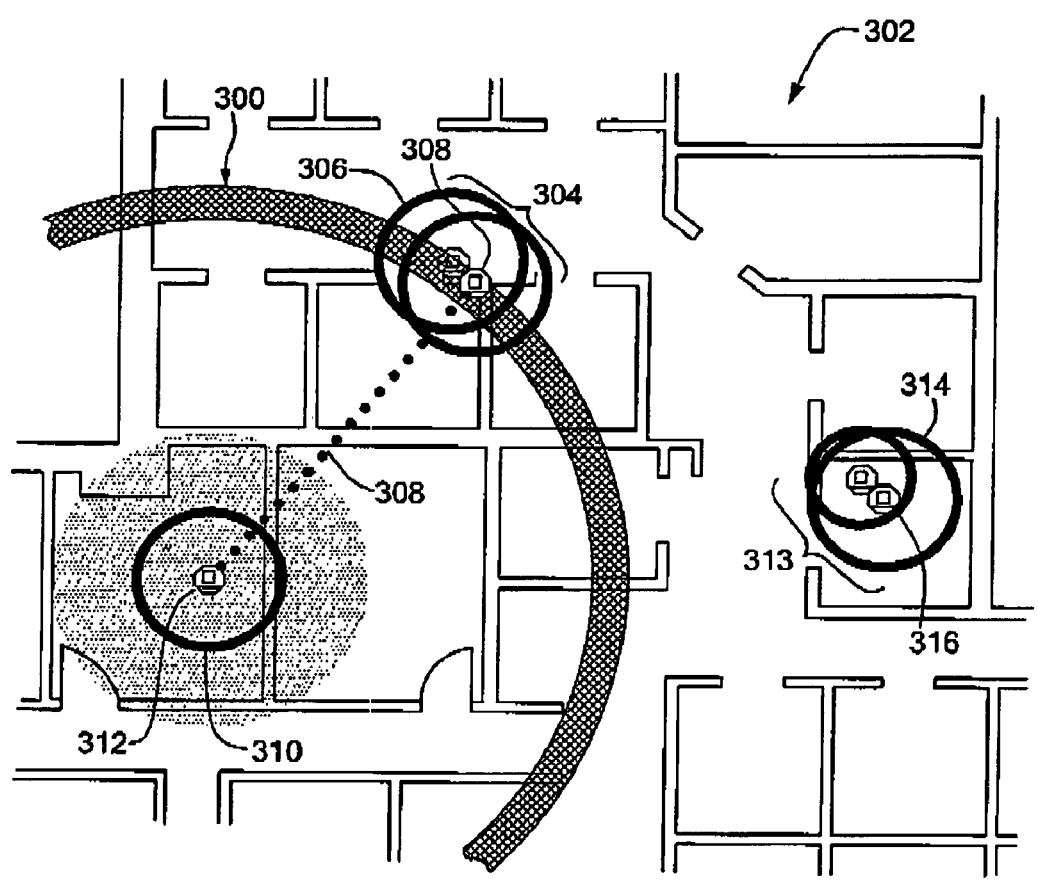
FIG. 23 shows a portion of a user interface display including a distance ring indicating potential locations of a wireless device that has been added to the wireless communication network, with respect to a known access point.

FIG. 23 shows an example of a portion 302 of a user interface display including a distance ring 300 indicating potential locations of a new wireless device represented by the dual mode access point representation 304, that has been added to a wireless communication network, with respect to a known access point corresponding to access point representation 312. The distance ring 300 indicates an estimated distance from the access point device corresponding to access point representation 312 at which the newly detected wireless device is located. The estimated distance may, for example be determined by the disclosed system based on a measured signal strength of transmissions from the newly detected wireless device received at the access point device corresponding to the access point representation 312.

As shown in FIG. 23, the portion 302 of user interface display includes a representation of the physical environment in which the wireless communication is deployed. Thus a user can determine potential physical locations of the newly discovered device from where the distance ring 300 is displayed over the representation of the physical environment in which the wireless network is deployed.

A power range ring 310 is further shown in FIG. 23 for the access point device corresponding to the access point representation 312. A dotted line 308 is shown connecting the access point representation 312 with the detected wireless device representation 304. The detected wireless device representation 304 has been moved, for example by way of a user dragging and dropping it, from its initial display within the access point display region where it initially was displayed when it was discovered. In the example of FIG. 23, the detected wireless device representation 304 corresponds to a "dual mode" access point device, thus including two independent sets of radio circuitry, each of which can independently operate using a separate radio frequency band. Accordingly, one of the conjoined access point representations is shown 308 having an associated power range ring 306. The communication channel on which the known access point has received transmissions from the newly detected wireless device may be displayed, for example, using the color of the distance ring 300. Another representation 313 of a dual mode access point is shown also including two conjoined access point representations, one of which is indicated 316 with a power range ring 314.

Figure 24:
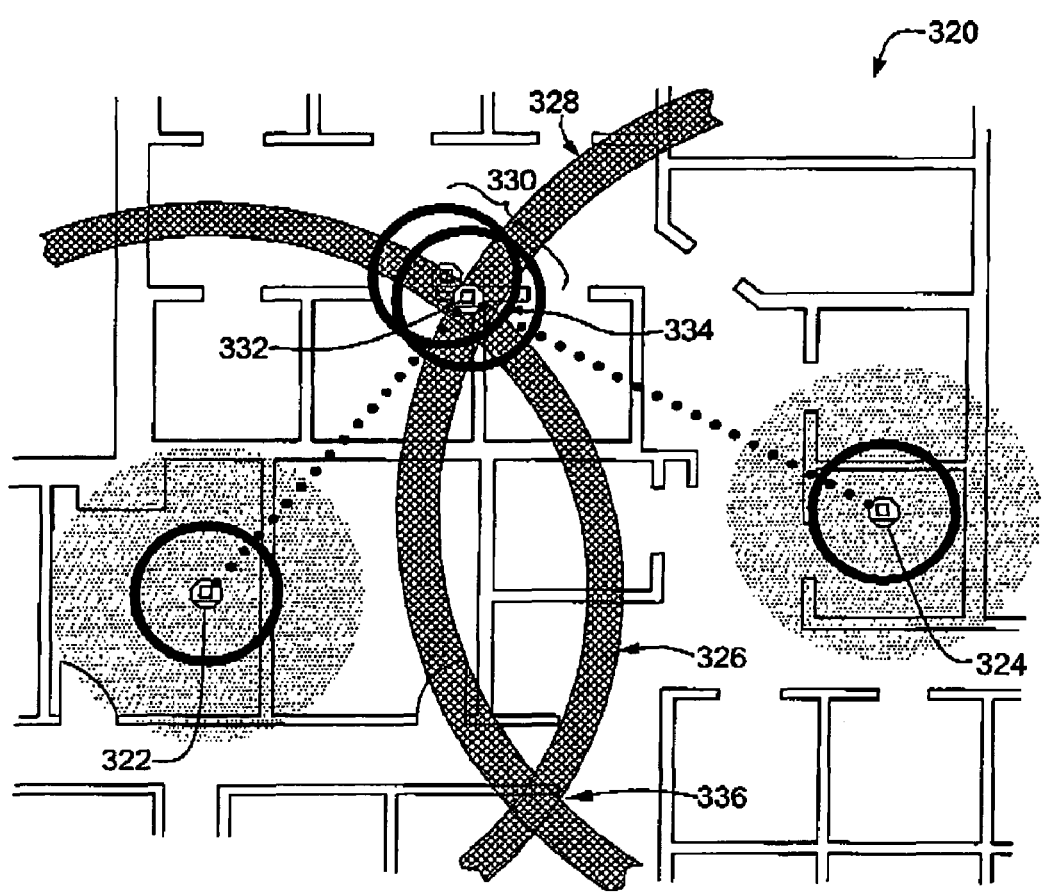
FIG. 24 shows a portion of a user interface display including multiple distance rings indicating potential locations of the wireless device that has been added to the wireless communication network, with respect to multiple corresponding known access points.

FIG. 24 shows a portion 320 of a user interface display, including distance rings 328 and 326 indicating potential locations 336 and 334 of a newly detected wireless device that has been added to the wireless communication network. As shown in FIG. 24, the distance ring 326 corresponds to and surrounds the access point representation 322, and the distance ring 328 corresponds to and surrounds the access point representation 324. Accordingly, the diameter of the distance ring 328 may be determined by the disclosed system based on measured signal strength of transmissions received from the newly detected device at the access point device corresponding to the access point representation 322. Similarly, the diameter of the distance ring 326 may be determined by the disclosed system based on a measured signal strength of transmissions received from the newly detected device at the access point device corresponding to the access point representation 324. The newly detected wireless device is shown for purposes of illustration in FIG. 24 by the dual mode access point representation 330, having conjoined access point representations including access point representation 332. The intersections 334 and 336 of the distance rings 326 and 328 are likely physical locations of the newly detected wireless device within the physical environment of the wireless network, which is displayed by a representation of the physical environment, such as a floor plan, within the display portion 320 of FIG. 24.

Figure 25:
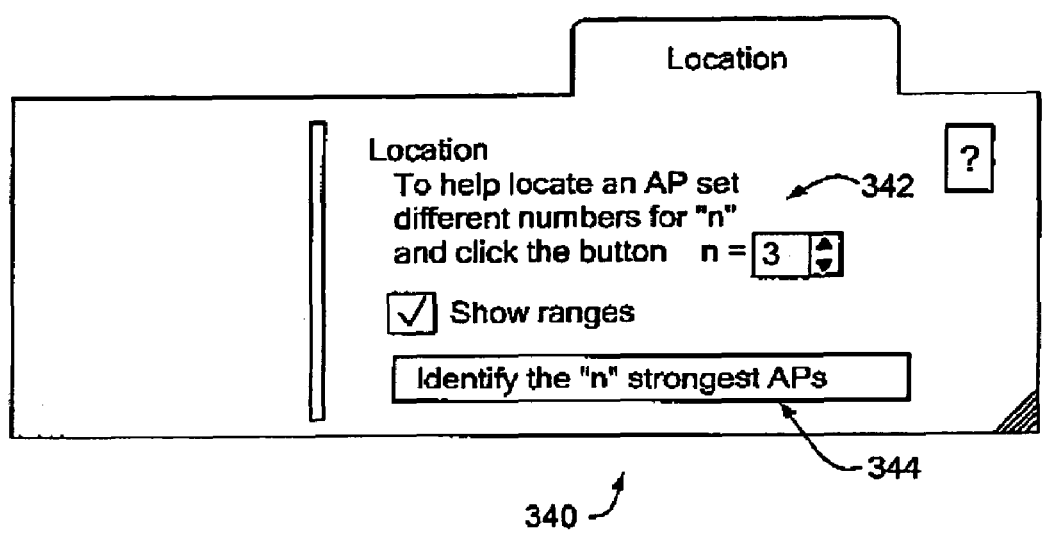
FIG. 25 shows a portion of a user interface display including a dialog box display object for a user to indicate a number of known access points for which distance rings are to be displayed with regard to a new device.

FIG. 25 shows a portion of a user interface display including a dialog box display object 340 for a user to indicate a number of known access points for which distance rings are to be displayed with regard to a newly discovered wireless device. The dialog box 340 may, for example, be provided to the user upon a right click or other specific type of selection of a graphic representation of the newly discovered wireless device. The field 342 enables the user to enter the number of "known" access points for which distance rings are to be generated to assist in determining a physical location of the newly discovered wireless device. Access points referred to herein as "known" are those access points with known physical positions. Known access point devices may, for example, include those access point devices that have previously been deployed in the managed wireless network, and for which physical positions, within the physical environment of the wireless network, have previously been determined and stored. The disclosed system may further determine those of the known access points that are currently receiving the strongest transmission signals from the newly discovered wireless device, and select those known access points having the strongest received signals from the newly discovered wireless device as those access points for which distance rings are displayed. A button 344 further enables a user to identify the 'n' access points having the strongest received signals from the newly discovered wireless device.

Those skilled in the art will recognize that the physical characteristics of the execution environment for the wireless communication network being managed may have an impact on the likely physical locations of newly discovered devices provided by the disclosed system. Accordingly, a skilled user may take into account certain physical characteristics of the physical environment, such as walls, which may introduce some amount of inaccuracy to distance determinations based on received power levels, as may be used in some embodiments of the disclosed system.

The specific graphical representations of devices shown in the present Figures are given purely for purposes of illustration, and the present invention may be embodied using other specific shapes, line formats, colors, or designs. For example, access point representations need not be represented using octagons, and client station representations need not be represented using squares—other specific shapes may be used as appropriate for a given embodiment. Similarly, line thickness of the power range rings is just one example of how potential bandwidth may be represented, and other line formats may be used to visually represent the potential bandwidth available within the power range rings. Additionally, line thickness is just one example of how distance rings may be presented in a way that is visually distinct from the graphic displays for power range rings. Moreover, while the color of access point, power range ring, distance, and client station representations is used in the exemplary embodiments to distinguish between different channels currently in use by the corresponding wireless devices, other visual characteristics of such representations may alternatively be used to represent channel selection.

The above description of the preferred embodiments includes flowchart and block diagram illustrations of methods, apparatus (systems) and computer program products according to an embodiment of the invention. Those skilled in the art will recognize that the specific orders of steps shown in the flow charts are given purely for purposes of illustration, and that the actual order in which the described operations are performed may vary between embodiments, configurations, or based on specific operational conditions. It will be further understood that each block of the flowchart and block diagram illustrations, and combinations of blocks in the flowchart and block diagram illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Similarly, the above description of the preferred embodiments includes examples of user interface display objects for purposes of explanation. The present invention is not limited to the specific screen layouts, icon shapes, or other specific aspects of the exemplary display objects in the figures, and may be embodied using a variety of specific display objects, icon designs, and/or user interface designs.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

Finally, while the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

We claim:

1. A method for determining and representing at least one potential physical location of a wireless network device, comprising:
    detecting the presence of said wireless network device in a wireless communication network;
    generating a graphical representation of said detected wireless network device within a first display region of a graphical user interface, wherein said first display region of said graphical user is external to a second display region of said graphical user interface, and wherein said second display region of said graphical user interface includes a representation of a physical environment in which said wireless communication network is deployed;
    inputting, from a user, a number of known access points for which distance representations are to be generated; and
    generating a distance representation corresponding to each of said number of known access points, wherein each said distance representation represents an estimated distance from said corresponding known access point to said detected wireless network device.

2. The method of claim 1, wherein said distance representation comprises a substantially circular ring surrounding a graphical representation of each of said number of known access points within said second display region.

3. The method of claim 1, wherein said generating said distance representation corresponding to each of said number of known access points further comprises determining which known access points are estimated to be physically closest to said detected wireless network device.

4. The method of claim 1, wherein said generating said distance representation corresponding to each of said number of known access points further comprises determining said estimated distance from said corresponding known access point to said detected wireless network device based on a signal strength of at least one transmission from said detected wireless network device at said corresponding known access point.

5. The method of claim 1, wherein said detected wireless network device is an access point.

6. The method of claim 1, wherein said detected wireless network device is a station.

7. The method of claim 1, further comprising inputting a second number of known access points for which distance representations are to be generated, and generating a distance representation corresponding to each of said second number of known access points, wherein each said distance representation represents an estimated distance from said corresponding known access point to said detected wireless network device.

8. The method of claim 1, further comprising enabling a user to move said graphic representation of said detected wireless network device from said first display region into said second display region.

9. The method of claim 2, further comprising:
generating a number of substantially circular rings representing radio coverage range of each corresponding one of the known access points; and
wherein each said distance representation comprises a substantially circular ring generated in a visually distinct manner with respect to said substantially circular rings representing radio coverage range of each corresponding one of the known access points.

10. A system for determining and representing at least one potential physical location of a wireless network device, comprising:
device detecting logic operable to detect the presence of said wireless network device in a wireless communication network;
detected device display logic operable to generate a graphical representation of said detected wireless network device within a first display region of a graphical user interface, wherein said first display region of said graphical user is external to a second display region of said graphical user interface, and wherein said second display region of said graphical user interface includes a representation of a physical environment in which said wireless communication network is deployed;
number of known access points input logic operable to input, from a user, a number of known access points for which distance representations are to be generated; and
distance representation display logic operable to generate a distance representation corresponding to each of said number of known access points, wherein each said distance representation represents an estimated distance from said corresponding known access point to said detected wireless network device.

11. The system of claim 10, wherein said distance representation comprises a substantially circular ring surrounding a graphical representation of each of said number of known access points within said second display region.

12. The system of claim 10, wherein said generating said distance representation corresponding to each of said number of known access points further comprises determining which known access points are estimated to be physically closest to said detected wireless network device.

13. The system of claim 10, wherein said distance representation display logic is further operable to generate said distance representation corresponding to each of said number of known access points further by determining said estimated distance from said corresponding known access point to said detected wireless network device based on a signal strength of at least one transmission from said detected wireless network device at said corresponding known access point.

14. The system of claim 10, wherein said detected wireless network device is an access point.

15. The system of claim 10, wherein said detected wireless network device is a station.

16. The system of claim 10, further wherein said number of known access points input logic is further operable to input a second number of known access points for which distance representations are to be generated, and generating a distance representation corresponding to each of said second number of known access points, wherein each said distance representation represents an estimated distance from said corresponding known access point to said detected wireless network device.

17. The system of claim 10, wherein said detected device logic is further operable to enable a user to move said graphic representation of said detected wireless network device from said first display region into said second display region.

18. The system of claim 11, further comprising:
radio coverage range ring display logic operable to generate a number of substantially circular rings representing radio coverage range of each corresponding one of the known access point; and
wherein each said distance representation comprises a substantially circular ring generated in a visually distinct manner with respect to said substantially circular rings representing radio coverage range of each corresponding one of the known access points.

19. A computer program product including a computer readable medium, said computer readable medium having a computer program for determining and representing at least one potential physical location of a wireless network device stored thereon, said computer program comprising:
program code for detecting the presence of said wireless network device in a wireless communication network;
program code generating a graphical representation of said detected wireless network device within a first display region of a graphical user interface, wherein said first display region of said graphical user is external to a second display region of said graphical user interface, and wherein said second display region of said graphical user interface includes a representation of a physical environment in which said wireless communication network is deployed;
program code for inputting, from a user, a number of known access points for which distance representations are to be generated; and program code for generating a distance representation corresponding to each of said number of known access points, wherein each said distance representation represents an estimated distance from said corresponding known access point to said detected wireless network device.

20. A computer data signal embodied in a carrier wave, said computer data signal including at least one computer program for determining and representing at least one potential physical location of a wireless network device stored thereon, said computer program comprising:

program code for detecting the presence of said wireless network device in a wireless communication network;

program code for generating a graphical representation of said detected wireless network device within a first display region of a graphical user interface, wherein said first display region of said graphical user is external to a second display region of said graphical user interface, and wherein said second display region of said graphical user interface includes a representation of a physical environment in which said wireless communication network is deployed;

program code for inputting, from a user, a number of known access points for which distance representations are to be generated; and program code for generating a distance representation corresponding to each of said number of known access points, wherein each said distance representation represents an estimated distance from said corresponding known access point to said detected wireless network device.

21. A system for determining and representing at least one potential physical location of a wireless network device, comprising:

means for detecting the presence of said wireless network device in a wireless communication network;

means for generating a graphical representation of said detected wireless network device within a first display region of a graphical user interface, wherein said first display region of said graphical user is external to a second display region of said graphical user interface, and wherein said second display region of said graphical user interface includes a representation of a physical environment in which said wireless communication network is deployed;

means for inputting, from a user, a number of known access points for which distance representations are to be generated; and means for generating a distance representation corresponding to each of said number of known access points, wherein each said distance representation represents an estimated distance from said corresponding known access point to said detected wireless network device.

* * * * *